United States Patent [19]
Tesler

[11] Patent Number: 6,111,578
[45] Date of Patent: *Aug. 29, 2000

[54] METHOD, SYSTEM AND COMPUTER PROGRAM PRODUCT FOR NAVIGATING THROUGH PARTIAL HIERARCHIES

[75] Inventor: Joel D. Tesler, Cupertino, Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/845,465

[22] Filed: Apr. 25, 1997

Related U.S. Application Data

[62] Division of application No. 08/813,347, Mar. 7, 1997.

[51] Int. Cl.[7] .............................. G06F 3/00; G06F 13/00; G06T 15/20
[52] U.S. Cl. ...................... 345/356; 345/357; 345/419; 345/427; 345/473; 345/355
[58] Field of Search .................................. 345/356, 355, 345/357, 419, 427, 353, 976, 473

[56] References Cited

U.S. PATENT DOCUMENTS

| | | | |
|---|---|---|---|
| 3,816,726 | 6/1974 | Sutherland et al. | 345/425 |
| 4,719,571 | 1/1988 | Rissanen et al. | 364/300 |
| 4,868,771 | 9/1989 | Quick et al. | 395/500.29 |
| 4,928,247 | 5/1990 | Doyle et al. | 345/356 |
| 4,994,989 | 2/1991 | Usami et al. | 345/420 |
| 5,043,920 | 8/1991 | Malm et al. | 345/419 |
| 5,072,395 | 12/1991 | Bliss et al. | 701/200 |
| 5,150,457 | 9/1992 | Behm et al. | 345/420 |
| 5,164,904 | 11/1992 | Sumner | 701/117 |
| 5,201,047 | 4/1993 | Maki et al. | 395/600 |
| 5,228,119 | 7/1993 | Mihalisin et al. | 345/419 |
| 5,247,666 | 9/1993 | Buckwold | 395/600 |

(List continued on next page.)

OTHER PUBLICATIONS

Venables, W.M. and Ripley, B.D., *Modern Applied Statistics with S–PLUS*, Springer–Verlag, 1994, pp. 413–425.

Mihalisin, T. et al. "A Robust Visual Access and Analysis System for Very Large Multivariate Databases," *Computing Science and Statistics, Vol. 26, Computationally Intensive Statistical Mode ls, Proceedings of the 26th Symposium on the Interface*, Jun. 15–18, 1994, pp. 426–430.

*Primary Examiner*—Raymond J. Bayerl
*Assistant Examiner*—Cuong T. Thai
*Attorney, Agent, or Firm*—Sterne, Kessler, Goldstein & Fox PLLC

[57] ABSTRACT

A method, system, and computer program product provides data visualization which optimizes visualization of and navigation through hierarchies. A partial hierarchy is generated and displayed. The partial hierarchy consists of a number levels at least equal to a predetermined depth and less than a total number of levels included in a corresponding complete hierarchy. Parent nodes in the bottom level of the partial hierarchy have segments of connection lines extending toward child nodes not included in the partial hierarchy. A user is permitted to mark selected nodes or locations in a displayed partial hierarchy. Partial hierarchies are generated and stored in a cache or generated on-the-fly. Each partial hierarchy ends at a progressively deeper level. An interpolator interpolates a partial hierarchy layout by interpolating corresponding nodes in two partial hierarchies. A hierarchy manager manages partial hierarchies in response to requests from a viewer to move a camera to camera positions. Partial hierarchies are fetched from the cache or the interpolator. A display then displays display views of fetched partial hierarchies corresponding to the camera positions. During free-form navigation, a hierarchy manager determines and maintain an orientation based on at least one reference object. During zooming, an angular orientation is maintained through successive partial hierarchies. Mapping is also provided between a three-dimensional 3D partial hierarchy and a two-dimensional 2D overview of a complete hierarchy.

25 Claims, 24 Drawing Sheets

U.S. PATENT DOCUMENTS

| | | | |
|---|---|---|---|
| 5,251,131 | 10/1993 | Masand et al. | 364/419.08 |
| 5,253,333 | 10/1993 | Abe | 395/62 |
| 5,282,262 | 1/1994 | Kurashige | 345/426 |
| 5,295,243 | 3/1994 | Robertson et al. | 345/348 |
| 5,303,388 | 4/1994 | Kreitman et al. | 345/348 |
| 5,307,456 | 4/1994 | Mackay | 345/328 |
| 5,325,445 | 6/1994 | Herbert | 382/38 |
| 5,418,946 | 5/1995 | Mori | 395/600 |
| 5,420,968 | 5/1995 | Johri | 395/133 |
| 5,426,780 | 6/1995 | Gerull et al. | 395/600 |
| 5,459,829 | 10/1995 | Doi et al. | 345/420 |
| 5,463,773 | 10/1995 | Sakakibara et al. | 395/600 |
| 5,515,486 | 5/1996 | Ariro et al. | 345/437 |
| 5,519,865 | 5/1996 | Kondo et al. | 395/600 |
| 5,528,735 | 6/1996 | Strasnick et al. | 345/427 |
| 5,546,529 | 8/1996 | Bowers et al. | 345/355 |
| 5,553,163 | 9/1996 | Nivelle | 382/227 |
| 5,555,354 | 9/1996 | Strasnick et al. | 345/427 |
| 5,604,821 | 2/1997 | Ranganathan et al. | 382/236 |
| 5,634,087 | 5/1997 | Mammone et al. | 395/24 |
| 5,659,731 | 8/1997 | Gustafson | 395/604 |
| 5,671,333 | 9/1997 | Catlett et al. | 395/20 |
| 5,671,381 | 9/1997 | Strasnick et al. | 345/355 |
| 5,675,711 | 10/1997 | Kephart et al. | 395/22 |
| 5,675,785 | 10/1997 | Hall et al. | 395/613 |
| 5,675,786 | 10/1997 | McKee et al. | 395/614 |
| 5,678,015 | 10/1997 | Goh | 345/340 |
| 5,680,476 | 10/1997 | Schmidt et al. | 382/159 |
| 5,694,524 | 12/1997 | Evans | 395/77 |
| 5,696,964 | 12/1997 | Cox et al. | 395/605 |
| 5,706,495 | 1/1998 | Chadha et al. | 395/602 |
| 5,724,573 | 3/1998 | Agrawal et al. | 395/606 |
| 5,727,199 | 3/1998 | Chen et al. | 395/606 |
| 5,732,230 | 3/1998 | Cullen et al. | 395/339 |
| 5,737,487 | 4/1998 | Bellegarda et al. | 395/25.9 |
| 5,748,852 | 5/1998 | Mahler | 395/61 |
| 5,787,274 | 7/1998 | Agrawal et al. | 395/613 |
| 5,861,891 | 1/1999 | Becker | 345/433 |
| 5,877,775 | 3/1999 | Theisen et al. | 345/440 |

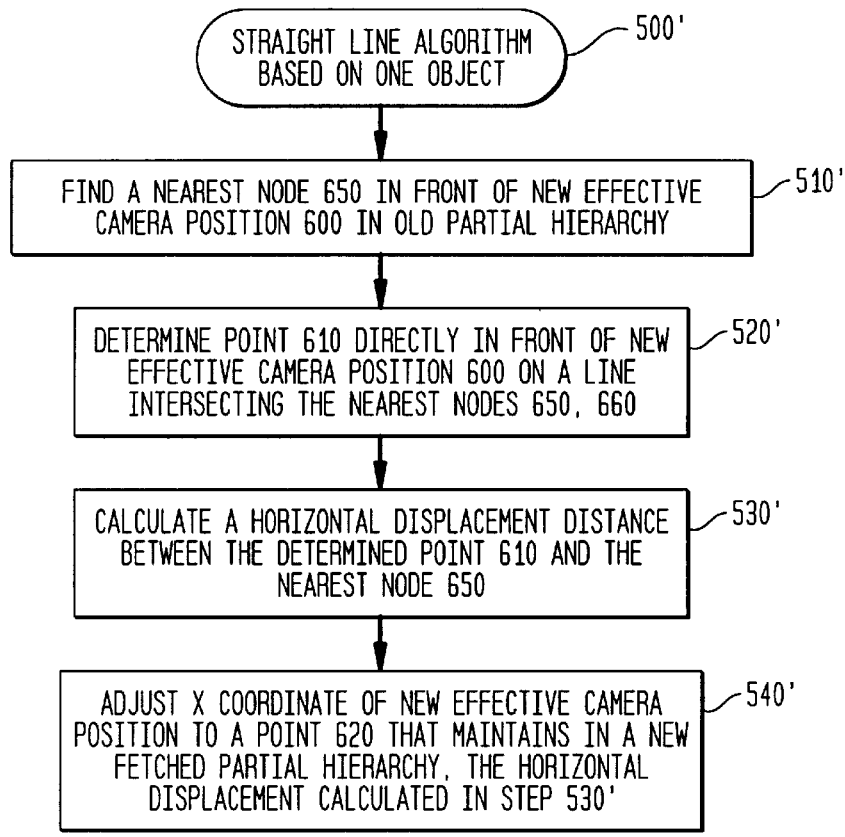
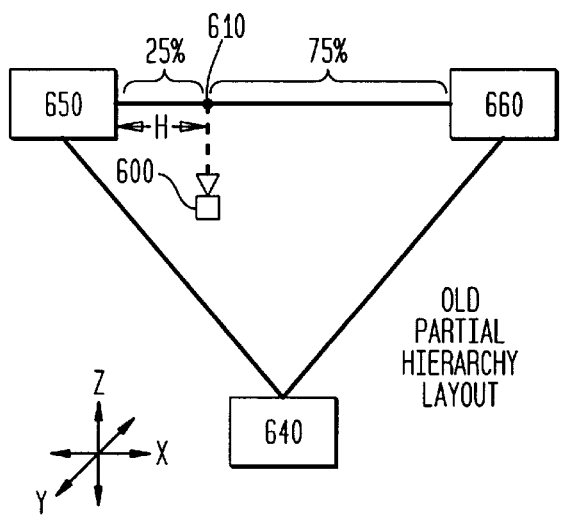
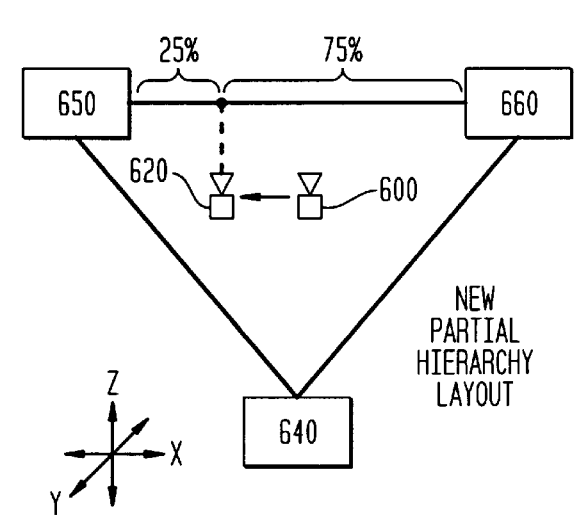

NEW PARTIAL HIERARCHY LAYOUT

FIG. 9
FIG. 10
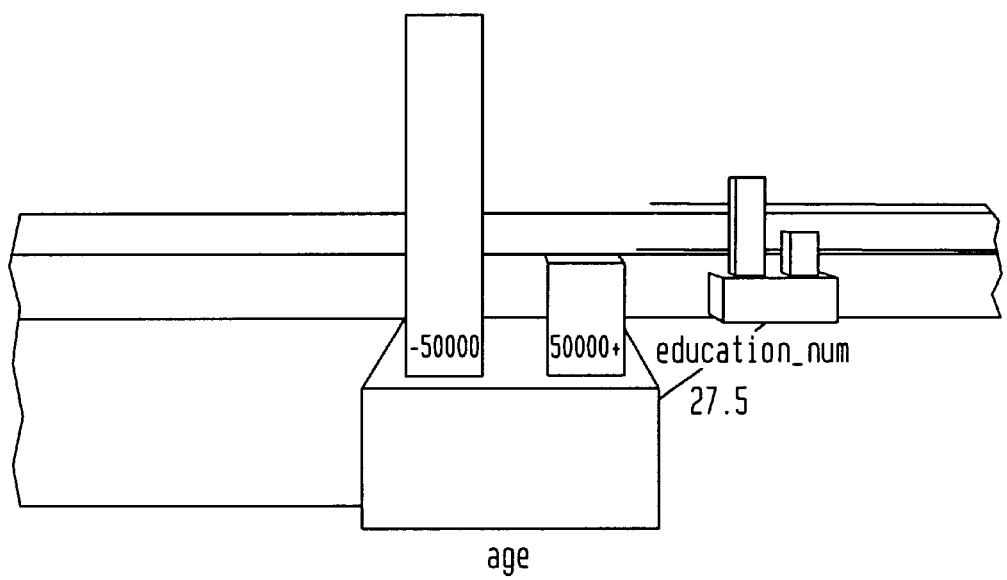
FIG. 11
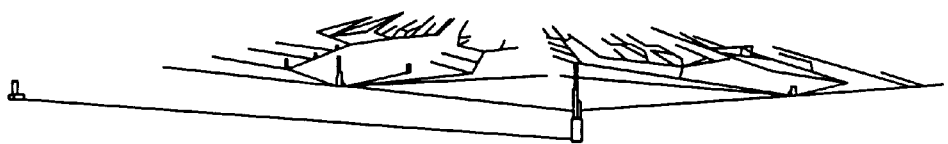

FIG. 37

| | Bars | Node Bases | Disks |
|---|---|---|---|
| Heights | | | |
| Normalize | | | ☑ normalize with bars |
|   Across each level | ☑ | ☑ | ☐ |
|   Across all levels | ☐ | ☐ | ☐ |
| Max/Scale heights | 1.00 | 1.00 | |
| Filter out % shortest | 0.00 % | | |
| Height Aggregation | Sum | Sum | Sum |
| Use Legend | ☐ | ☐ | ☐ |
| Colors | | | |
| Color list to use | [+][−][♫][♫] | [+][−][♫][♫] | [+][−][♫][♫] |
| Kind of mapping | Continuous | Continuous | Continuous |
| Color mapping | | | |
| Color Aggregation | Sum | Sum | Sum |
| Use Legend | ☐ | ☐ | ☐ |
| | ☑ Color by Key | | |

Make fixed: [1] as the number of bar: ☑ rows ☐ columns

Message [ ]
Sky Color [▓▓][+][−][♫][♫]      Ground Color [▓▓][+][−][♫][♫]
Base Label Color ☐    Bar Label Color ☐    Line Color ☐
Sort Order [Ascending ☐] ☑ Sort by key

[ OK ] [ Reset ] [ Cancel ] [ Help ]

METHOD, SYSTEM AND COMPUTER PROGRAM PRODUCT FOR NAVIGATING THROUGH PARTIAL HIERARCHIES

CROSS-REFERENCE TO RELATED APPLICATIONS

This application is a division of application Ser. No. 08/813,347, filed Mar. 7, 1997, (status: pending).

This patent application is related to the following commonly owned, co-pending United States utility patent applications:

1. Application Ser. No. 08/467,620, filed Jun. 6, 1995, entitled "A Method and Apparatus for Indicating Selected Objects by Spotlight" by Strasnick et al. (Atty. Docket No. 15-4-103.01/1452.0180001), now pending and incorporated herein by reference, which is a divisional application of a parent application, entitled "Method and Apparatus for Displaying Data Within a Three-Dimensional Information Landscape," by Strasnick et al., Ser. No. 08/042,801, filed Mar. 23, 1993, now U.S. Pat. No. 5,528,735 (incorporated herein by reference in its entirety herein); and 2. Kohavi and Tesler, "Method, System and Computer Program Product for Visualizing a Decision Tree Classifier," Serial no. unassigned, Attorney Docket No. 15-4-471.00, 1452.2220000, (filed concurrently herewith and incorporated by reference in its entirety herein).

BACKGROUND OF THE INVENTION

1. Field of the Invention

The present invention relates generally to data visualization and data mining.

2. Problem Overcome By Invention

Electronic data is lifeblood for modem, technology-based society. Advances in computer and networking technology now provide access to an increasing volume and range of data. Businesses, government, and individuals must assimilate relevant information from larger amounts of data. The size, scope, and complexity of data can overwhelm human cognitive abilities. It is increasingly important that information be extracted from the data and presented to a user in a manner commensurate with human cognitive ability.

Virtual reality-based (VR) data visualizations now use hierarchies to represent large collections of complex data and data attributes. A hierarchy data visualization provides greater contextual information for electronic data in a single display view which is more easily assimilated by the human brain than conventional data displays. Data attributes are mapped into objects (or nodes) laid out in a hierarchy. Graphical attributes of the objects in the hierarchy, such as, color and height, also represent different data attributes. A hierarchy can arrange nodes according to a two-dimensional (2D) or three-dimensional (3D) display model representing a tree, perspective wall, cone tree (e.g., a cone tree by Xerox PARC), clusters, nets, links, and/or bar charts. See, Alan Wexelblat, Ed., *Virtual Reality: Applications and Explorations* (Academic Press: MA; Publication Date, Jul. 1, 1993), Chapter 3, pages 45–74 (incorporated herein by reference).

Hierarchies become too complicated when faced with larger collections of complex data. An attempt to display global contextual information for complicated data can overwhelm or diminish a user's ability to focus on local aspects of the data visualization. Conversely, displaying detail on selected, local aspects of a data visualization masks display of global contextual information.

What is needed is a graphics display tool which optimizes data visualization. A virtual-reality (VR) data visualization is needed which conveys global and local contextual information even for large collections of complex data.

Effective navigation capability is also needed. A user must be able to navigate through a VR data visualization comfortably. Rich contextual information, including graphical attributes representative of data attributes, must be clearly presented to maximize the degree of interest to the user. The content and level of detail must be commensurate with a user's ability to perceive and absorb graphical display information.

Effective display of hierarchies which have a large aspect ratio is especially difficult. Hierarchies can be described with respect to a three-dimensional orthogonal coordinate system (x,y,z). The x coordinate dimension is parallel to the width dimension of a hierarchy, or in other words, left and right across a display screen. The y coordinate dimension is parallel to the height dimension of the hierarchy, or in other words, up and down a display screen The z coordinate dimension is parallel to the line of sight of a user along a hierarchy toward a hierarchy horizon, or in other words, is perpendicular to the display screen (e.g., a positive z direction begins at the back of a hierarchy and extends forward along hierarchy toward the root node and a display screen).

Hierarchies with a large aspect ratio are relatively wide in the x-dimension compared to their depth in the z-dimension. Conventional techniques for laying out nodes in a hierarchy force room to be made for lower level nodes. When a hierarchy is initially generated, the positions of the bottom child nodes or leaf nodes are spread out across the width of a hierarchy. The positions of higher level parent nodes are then determined and distributed across the width of hierarchy. In this way, parent nodes have a separation dependent upon the number of child nodes in lower levels—even if the child nodes are not later rendered in a particular display view!

When a hierarchy is large, this separation of parent nodes in the complete hierarchy layout can limit the number of parent nodes which are seen effectively in a single display view. This drawback is most evident when trying to observe nodes in levels of a hierarchy closest to a given camera position.

For example, FIG. 1 (not drawn to exact scale) shows a hierarchy 100 having four levels of nodes. According to conventional hierarchy generation techniques, each level of nodes is laid out in succession beginning at the bottom level, that is, Level 4. Child nodes in Level 4 are positioned at approximately the same z coordinate position corresponding to Level 4. The Level 4 nodes are distributed at different x coordinate positions across the hierarchy 100. The Level 4 nodes are spaced approximately equally across the x coordinate dimension, although additional spaces can be added to further separate groups of child nodes that share a common respective parent node in Level 3 or above.

Nodes in Level 3 are then laid out along the width of the hierarchy 100 at the z coordinate position corresponding to Level 3. The specific x coordinate positions of these nodes in Level 3 is approximately the average x coordinate position of corresponding child nodes laid out previously in Level 4. Similarly, x coordinate positions of nodes in Levels 2 and 1 depends upon the average x coordinate position of corresponding child nodes previously laid out in the lower levels.

As mentioned above, the resulting separation of parent nodes in higher levels of a complete hierarchy layout can limit the number of parent nodes which are seen effectively in a single display view. For example, as shown in FIG. 1, a display view of hierarchy 100 that covers a width $s_w$ would only include the two inner nodes of Level 2. This is especially true for display views beginning at effective camera positions located near Level 2. Moving the camera position further back from the Level 2 nodes (that is, in a positive z-direction up along the hierarchy) allows more nodes to be included in a single display view; however, the nodes are then appear flier away from the user making it more difficult to observe graphical attributes of the nodes and other local detail. Moreover, even if a user was only interested in viewing Levels 2 and 3 and wanted to hide the lower Level 4, only the two inner nodes of Level 2 would be seen in camera positions taken close to Level 2 because the x coordinate positions of the nodes in Level 2 are separated based on the lower level children laid out in Level 4.

Artificial perspective can added to compress the spacing of each node in the lower levels. For example, as described in U.S. Pat. No. 5,528,735, incorporated by reference above, the x coordinate of each node is compressed by a magnitude which is a function of the respective node's z coordinate (in other words, the distance of a level from a landscape base point X). Such artificial perspective can increase the number of nodes which are included in a display view; however, parent nodes are still separated based on room made in the hierarchy for lower level nodes.

SUMMARY OF THE INVENTION

As discovered by the inventor, what is needed is a method and system for generating a partial hierarchy such that parent nodes are not forced apart to make room for child nodes in all lower levels. Partial hierarchies need to be generated that allow a greater number of nodes closest to the user to be displayed without sacrificing quick and smooth navigation through the overall hierarchy. Only nodes lying within a predetermined depth from a user's effective camera position need to be laid out and stored for rendering in a single display view.

Further, as a user traverses through a hierarchy, space for lower nodes is allocated first, driving higher nodes apart. This apparent motion needs to be compensated for during navigation to provide a user with the perception of navigating in a straight line.

While three-dimensional (3D) partial hierarchies will display only a part of an entire complete hierarchy, a two-dimensional 2D overview can be used to show the full hierarchy. The 2D overview provides the user with context showing where the user is located within the overall hierarchy. A mapping between a 2D overview and a 3D partial hierarchy, according to the present invention, is needed.

The present invention provides a method, system, and computer program product for data visualization which optimizes visualization of and navigation through hierarchies. According to one embodiment of the present invention, a partial hierarchy is generated and displayed. The partial hierarchy consists of a number levels at least equal to a predetermined depth and less than or equal to a total number of levels included in a corresponding complete hierarchy. In a partial hierarchy according to the present invention, parent nodes are not forced apart to make room for child nodes in all lower levels. A partial hierarchy further allows a greater number of nodes closest to the user to be displayed without sacrificing quick and smooth navigation through data in the complete hierarchy. Only nodes lying within a predetermined depth from a user's effective camera position need be laid out and stored for rendering in a single display view.

According to another feature of the present invention, parent nodes in the bottom level of the partial hierarchy have segments of connection lines extending toward child nodes not included in the partial hierarchy. These segments provide additional contextual information to guide a user during navigation.

According to one embodiment of the present invention, a cache of partial hierarchies is generated and stored. Each partial hierarchy in the cache ends at a progressively deeper level. Each partial hierarchy includes at least a number levels equal to a predetermined depth. An interpolator generates an interpolated partial hierarchy by interpolating the positions of corresponding nodes in two partial hierarchies retrieved from the cache.

A hierarchy manager manages partial hierarchies in response to requests from a viewer to move a camera to camera positions. Partial hierarchies are fetched from the cache or the interpolator. A display unit then displays display views of fetched partial hierarchies at corresponding camera positions.

According to one embodiment of the present invention, to determine whether a partial hierarchy can be fetched from the cache or the interpolator, a hierarchy manager first determine a z' position equal to a z coordinate of a first effective camera position advanced by a number of levels equal to a predetermined depth (e.g., z'=z+depth). The hierarchy manager determines first and second partial hierarchies in the cache based on the z' position. The first and second partial hierarchies end at different respective bottom levels (for clarity, called first and second bottom levels corresponding to the first and second partial hierarchies to be interpolated).

When the z' position lies between the first bottom level and the second bottom level, the hierarchy manager calls the interpolator. The interpolator generates an interpolated partial hierarchy based on the first and second partial hierarchies. The x coordinate location of each node in the interpolated partial hierarchy is determined by interpolating between the x coordinate locations of corresponding nodes in the first and second partial hierarchies in proportion to the location of the z' position between the first bottom level and the second bottom level.

According to another feature of the present invention, navigation is provided through partial hierarchies. A hierarchy manager determines a new effective camera position (x,z) within a current partial hierarchy based on a new navigator position. A new partial hierarchy corresponding to the new effective camera position is fetched.

The hierarchy manager then determines an orientation between the new effective camera position and at least one reference object in the current partial hierarchy. The hierarchy manager adjusts the new effective camera position to maintain the orientation with the at least one reference object as found in the new, fetched partial hierarchy. The new effective camera position is then converted to a new camera position for the navigator. A viewer displays a display view showing the fetched partial hierarchy layout in a field of view of a camera positioned at the new camera position. In this way, a user viewing a current partial hierarchy at a current camera position can navigate in a substantially straight line to a new navigator position.

According to two further features of the present invention, straight line motion during free-form navigation can be based on two reference nodes or one reference node. When two reference nodes are to be used, hierarchy manager finds two reference nodes in the current partial hierarchy. The hierarchy manager then determines a point in front of the new effective camera position on a line intersecting the two reference nodes. The hierarchy manager then calculates a proportion of the distance between the determined point and one of the two reference nodes and the total distance between the two reference nodes. The x coordinate of the new effective camera position is adjusted to maintain the proportion with respect to the two reference nodes as found in the new, fetched partial hierarchy.

When one reference node is to be used for orientation during free-form navigation, hierarchy manager finds one reference node in the current partial hierarchy. The hierarchy manager then determines a displacement distance between the new effective camera position and the one reference node in the current partial hierarchy. For example, the displacement distance can be a horizontal displacement distance H along the x coordinate. The x coordinate of the new effective camera position is adjusted to maintain the displacement distance with respect to the one reference node as found in the new, fetched partial hierarchy.

According to another feature of the present invention, zooming navigation over partial hierarchies is provided. To zoom to a selected object, the hierarchy manager determines an angle $\theta$ between the new effective camera position and the selected object in the current partial hierarchy. The x coordinate of the new effective camera position is adjusted to maintain the angle $\theta$ with respect to the one selected object as found in the new, fetched partial hierarchy.

According to another embodiment of the present invention, mapping is provided between a three-dimensional (3D) partial hierarchy and a two-dimensional (2D) overview of a complete hierarchy. A viewer determines a 3D camera position (x,y,z) of a camera viewing the 3D partial hierarchy. A z coordinate of the 3D camera position is mapped (e.g. copied) to a y coordinate of a 2D camera position. To map the x coordinate, the viewer determines an orientation between the 3D camera position and at least one reference object in the 3D partial hierarchy. The viewer then determines an x coordinate of the 2D camera position that maintains the same orientation in the 2D overview.

According to three further features of the present invention, orientation for mapping between a 3D partial hierarchy and a 2D overview can be determined based on two reference nodes, one reference node, or an angular orientation. When two reference nodes are to be used, two reference nodes are found in the 3D partial hierarchy. A point in front of the 3D camera position on a line intersecting the two reference nodes is determined. A proportion of the distance between the determined point and one of the two reference nodes and the total distance between the two reference nodes is calculated. Finally, the viewer determines an x coordinate of the 2D camera position that maintains the proportion with respect to the two reference nodes as found in the 2D overview of a complete hierarchy.

When one reference node is to be used for mapping, one reference node is found in the 3D partial hierarchy. A displacement distance between the 3D camera position and the one reference node in the 3D partial hierarchy is determined. The viewer determines an x coordinate of the 2D camera position that maintains the displacement distance with respect to the one reference node as found in the 2D overview of a complete hierarchy.

When an angular orientation is to be used in mapping, one reference node is found in the 3D partial hierarchy. An angle $\theta$ between the 3D camera position and the one reference node in the 3D partial hierarchy is determined. The viewer determines an x coordinate of the 2D camera position that maintains the angle $\theta$ with respect to the one reference node as found in the 2D overview of a complete hierarchy.

Similar steps are performed to map a camera position in a 2D overview of a complete hierarchy to a 3D partial hierarchy.

According to another feature of the present invention, a user is permitted to mark selected objects or specific locations in a displayed partial hierarchy. To reference a mark for a selected object, relative coordinates are used. The relative coordinates identify a location of the mark relative to a selected object. Absolute coordinates are stored to reference a mark for a specific location. Absolute coordinates are only directly interpreted when a camera position is at similar coordinates, such as, at an identical z coordinate position. Otherwise, the absolute coordinates are interpreted by first transforming the absolute coordinates for a selected location to a coordinate system at a current camera position. For example, x and y coordinates of a stored marked location are directly interpreted only when the camera position is at the same z coordinate. Otherwise, when the camera position is not equal to the z position of an absolute mark coordinate, the x and y coordinate are transformed using a free-form navigation algorithm (based on one or two reference objects) and/or artificial perspective.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 3A shows a routine for generating a cache of partial hierarchies. FIG. 3B shows an example partial hierarchy layout FIG. 3C shows an example routine for generating a cache of partial hierarchies in more detail than FIG. 3A.

FIG. 5B is a flowchart of an algorithm that maintains straight line motion based on one reference object, according to the present invention.

FIGS. 6A and 6B illustrate an example of straight line motion based on two reference nodes for a navigation path extending between camera positions on respective old and new partial hierarchy layouts.

FIGS. 9, 10, 11, and 12 are example display views drawn based on a conventional complete hierarchy layout. FIG. 9 is a display view of a complete hierarchy without artificial perspective. FIG. 10 is a display view of a complete hierarchy without artificial perspective viewed from a root node. FIG. 11 is a display view of a complete hierarchy with artificial perspective. FIG. 12 is a display view of a complete hierarchy with artificial perspective viewed from a root node.

FIG. 13 is a display view of an entire partial hierarchy with artificial perspective. FIG. 14 is a display view of the partial hierarchy shown in FIG. 13, as viewed from a root node.

FIG. 36A shows a marks window for controlling the selection and deselection of marks. FIG. 36B3 show a panel for creating a new mark in a hierarchy data visualization according to the present invention. FIG. 36C shows a display view of a partial hierarchy including user-selected marks according to the present invention.

FIG. 37 shows a tree visualizer configuration dialog box for changing hierarchy data visualization tool default parameters according to the present invention.

DETAILED DESCRIPTION OF THE EMBODIMENTS

Table of Contents

Figure 1:
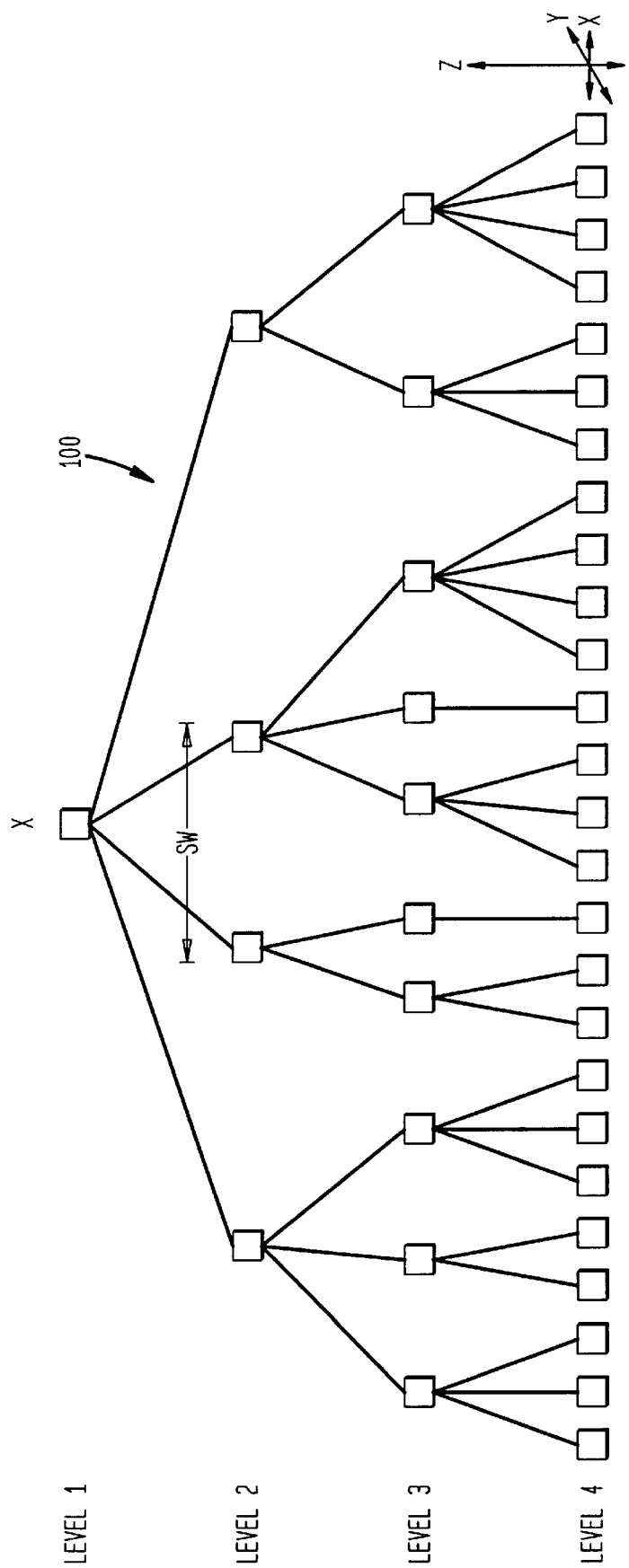
FIG. 1 illustrates a conventional complete hierarchy layout.

1. Overview and Terminology
2. Example Environment
3. Partial Hierarchy Architecture
4. Partial Hierarchy Generation
5. Partial Hierarchy Navigation
   a. Straight Line Motion
   b. Straight Line Motion Based on Two Objects
   c. Straight Line Motion Based on One Object
6. Zooming Navigation
7. Example Display Views
8. Mapping Between a 2D Overview and a 3D Partial Hierarchy
9. Marking
10. Example GUI Computer Environment
11. Hierarchy Data Visualization Tool
    a. Example Hierarchy Data Visualization Tool
    b. Control Bar Menus
    c. Search Panel
    d. Filter Panel
    e. Marks Panel
    f. Configuration Options
12. Example Tool Manager and Network
13. Conclusion

1. Overview and Terminology

A method, system, and computer program product provides data visualization which optimizes visualization of and navigation through hierarchies. Partial hierarchies are generated and displayed. Partial hierarchies consist of a number levels at least equal to a predetermined depth and less than or equal to a total number of levels included in a corresponding complete hierarchy.

Parent nodes in the bottom level of the partial hierarchy can have segments of connection lines extending toward child nodes not included in the partial hierarchy.

A cache of partial hierarchies is generated and stored. Each partial hierarchy in the cache ends at a progressively deeper level. Each partial hierarchy includes at least a number levels equal to a predetermined depth. An interpolator interpolates a partial hierarchy layout by interpolating corresponding nodes in two partial hierarchies in the cache. A hierarchy manager manages partial hierarchies in response to requests from a viewer to move a camera to camera positions. Partial hierarchies are fetched from the cache or the interpolator. A display unit displays display views of fetched partial hierarchies corresponding to the camera positions.

Straight line motion is provided in navigation through partial hierarchies. During free-form navigation, a hierarchy manager determines and maintains an orientation based on at least one reference object. To zoom to a selected object, a hierarchy manager determines and maintains an angular orientation relative to the selected object.

Mapping is also provided between a 3D partial hierarchy and a 2D overview of a complete hierarchy.

A user is permitted to mark selected objects or specific locations in a displayed partial hierarchy. To reference a mark for a selected object, relative coordinates are used. The relative coordinates identify a location of the mark relative to a selected object. Absolute coordinates are stored to reference a mark for a specific location. Absolute coordinates are only directly interpreted when a camera position is at similar coordinates, such as, at an identical z coordinate position. Otherwise, the absolute coordinates are interpreted by first transforming the absolute coordinates for a selected location to a coordinate system at a current camera position.

To more clearly delineate the present invention, an effort is made throughout the specification to adhere to the following term definitions as consistently as possible.

The term "hierarchy data visualization," "hierarchy," "tree," "hierarchy layout," and equivalents thereof, are used interchangeably refer to any type of two-dimensional or three-dimensional display model using a hierarchical layout of nodes to graphically represent data attributes. For example, a hierarchy can include, but is not limited to, a hierarchy, tree, information landscape, cone (e.g. a XEROX™ PARC cone), cluster, and net.

A "hierarchy" is an arrangement of nodes in multiple levels. Higher levels are those levels closer to a camera position Lower levels (also called deeper levels) are located further from the camera viewpoint. Connection lines serve to connect parent nodes and child nodes in different levels.

"Nodes," also called cells, are laid out in a hierarchy layout. Each node can have one or more graphical objects (e.g. bases, bars, disks). Each object has one or more graphical attributes (e.g. color, size) representative of corresponding data attributes in the data being visualized. "Sub-nodes" are the nodes in the one or more lower levels below a higher level. Nodes in the higher level being closer to a root of the tree than sub-nodes in the lower level(s).

"Complete hierarchy," "complete hierarchy layout," and equivalents thereof, and used interchangeably to refer to a hierarchy generated such that all levels of nodes are included in a single layout.

"Partial hierarchy," "partial hierarchy layout," and equivalents thereof and used interchangeably to refer to a portion of a complete hierarchy generated according to the present invention.

"Artificial perspective" of a hierarchy refers to additional compressing of objects at deeper levels in a hierarchy. The magnitude of this compressing of objects is greater at deeper levels so that more objects are included in a single display of a complete hierarchy compared to normal perspective. One example of artificial perspective in which the magnitude of compression is a function of the depth of the effective camera position in the hierarchy is described in U.S. Pat. No. 5,528,735 (incorporated herein by reference above).

"Hierarchy data visualization tool," "tree data visualization," and equivalents thereof, refer to any visualization tool for visualizing data in a partial hierarchy and/or complete hierarchy on a computer graphic display, including but not limited to, the tree visualizer data visualization tool described herein. Any type of data (e.g., business, scientific, educational, mathematical), data attributes, and variables, can be visualized through graphical attributes in a hierarchy or tree data visualization.

"Camera position" refers to an actual camera position or navigator position within a hierarchy. Because a user looking forward in a camera field of view over a hierarchy cannot see directly under the camera, the term "effective camera position" is used to refer to the position where the user thinks they are. From the user's point of view the effective camera position can be any location relative the actual camera position. In terms of the coordinate system described below, the effective camera position can be in front of the actual camera position in the negative z direction by a predetermined amount (e.g. one level). Alternatively, the effective camera position can be, but is not limited to, a location calculated to be the point where a viewpoint intersects the ground plane of a displayed partial hierarchy or the bottom of a display window.

2. Example Environment

The present invention is described in terms of an example computer graphics and data mining environment. Given the description herein, it would be obvious to one skilled in the art to implement the present invention in any general computer including, but not limited to, a computer graphics processor (single chip or multiple chips), high-end to low-end graphics workstations, virtual machine (e.g. Java-created application), and network architectures (e.g., client/server, local, intermediate or wide area networks). In one preferred example, the present invention can be implemented as software, firmware, and/or hardware in a data mining tool, such as, the MineSet product released by Silicon Graphics, Inc., and executed on a graphics workstation manufactured by Silicon Graphics, Inc. (e.g., an Indigo$^2$, Indy, Onyx, O$_2$ or Octane workstation). A further example computer system and network is described below with respect to FIGS. 27 and 38, but is not intended to limit the present invention.

Description in these terms is provided for convenience only. It is not intended that the invention be limited to application in this example environment. In fact, after reading the following description, it will become apparent to a person skilled in the relevant art how to implement the invention in alternative environments.

3. Partial Hierarchy Architecture

Figure 2:
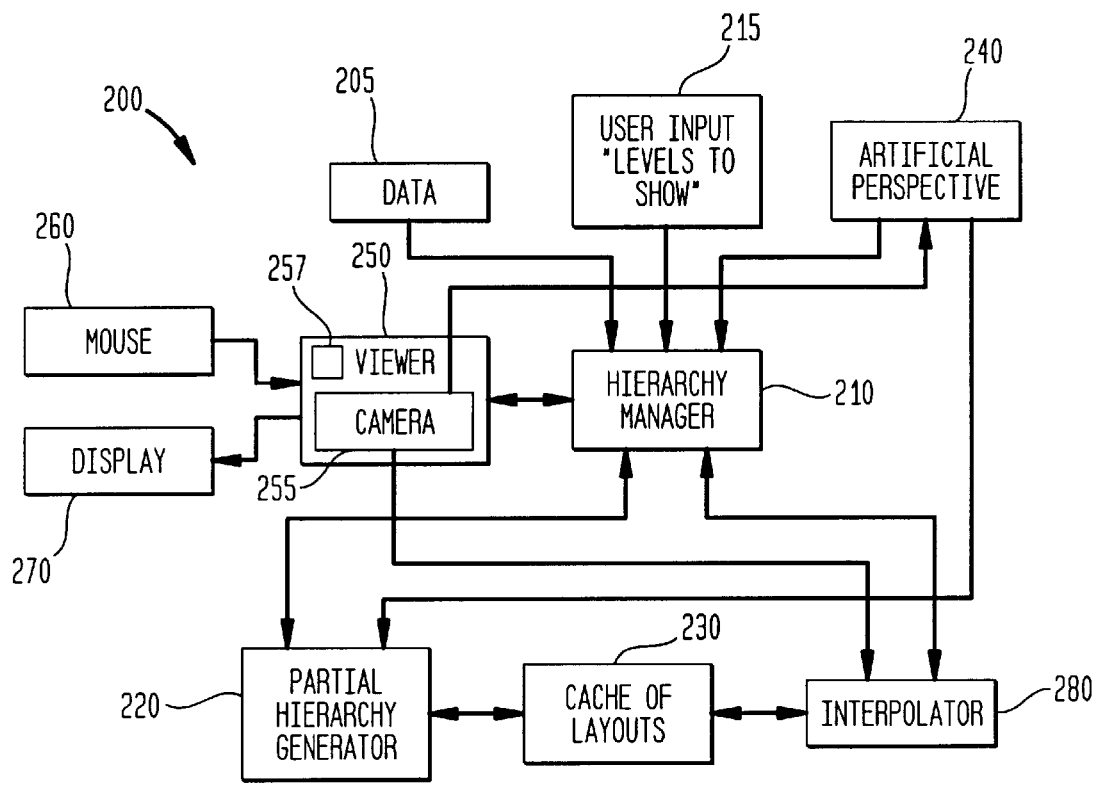
FIG. 2 is a diagram of a partial hierarchy management system according to the present invention.

FIG. 2 illustrates an example graphics processing system 200 for generating and navigating through partial hierarchies according to the present invention. A hierarchy manager 210 manages partial hierarchy generator 220 and interpolator 280 to provide a partial hierarchy to viewer 250. Viewer 250 renders the partial hierarchy for display on a display unit 270, such as, a monitor. Camera 255 tracks a navigator position and converts the navigator position to an effective camera position for flying through a partial hierarchy. A user interacts with viewer 250 using a mouse 260 or other peripheral input device. An overview map module 257 is included for mapping camera positions between a 3D partial hierarchy window and a 2-D overview window, according to the present invention, as described in further detail below with reference to the mapping routine 2600 in FIG. 26.

Data 205 that is to be visualized in a partial hierarchy is input to the hierarchy manager 210 (and/or partial hierarchy 220 and interpolator 280). Data 205 can be any form of data (and data attributes). Data 205 can be provided in the form of files (e.g., configuration files, data files, records) and/or direct user inputs.

Hierarchy manager 210 receives a partial hierarchy layout defining node positions. Hierarchy manager 225 then maps data 205 to form nodes in a partial hierarchy and to define graphical attributes at the nodes such as bases, bars, discs, labels, and connection lines. Alternatively, partial hierarchy generator 220 and interpolator 208 can map data 205 to form nodes and define graphical attributes.

Depth 215 defines the number of levels of a partial hierarchy that are shown in a display view during navigation. Depth 215 can be input by a user or set automatically, e.g., set to a predefined default value or previously-used value.

According to the present invention, partial hierarchy generator 220 generates a number of partial hierarchy layouts based on data 205 and depth 215. The partial hierarchy layouts are stored as a cache of layouts 230. Cache of layouts 230 is stored in a memory or other storage device. Cache of layouts 230 can be accessed by partial hierarchy generator 220 and interpolator 280.

Artificial perspective module 240 adds artificial perspective to the partial hierarchies. When selected by a user, artificial perspective module 240 provides additional compressing of the spacing of nodes along the x coordination dimension in proportion to the z coordinate position of the nodes. Such compressing is taken into account in generating the nodes positions for partial hierarchy layouts stored in cache of layouts 230.

Storing layouts in a cache 230 speeds the rendering of the layouts during run-time. The present invention, however, is not limited to, using a cache 230 as cache 230 is optional. Given enough processing power, caching of the partial hierarchy layouts can be eliminated, and partial hierarchy layouts can be calculated on the fly.

Figure 3A:
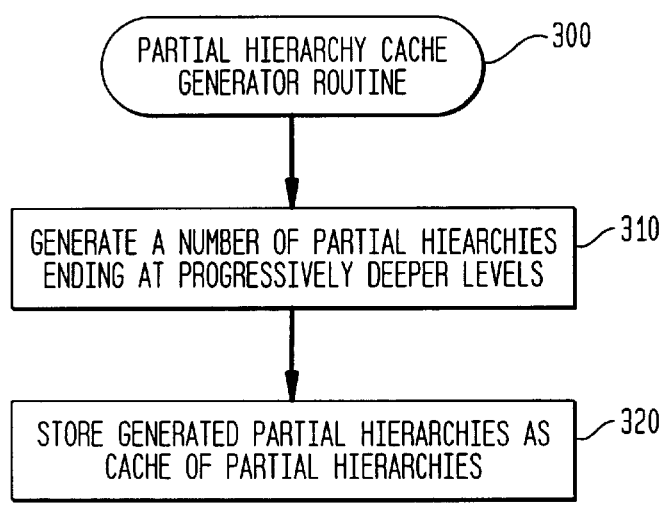
FIGS. 3A to 3C illustrate the generation of a cache of partial hierarchies according to the present invention.
Figure 3B:
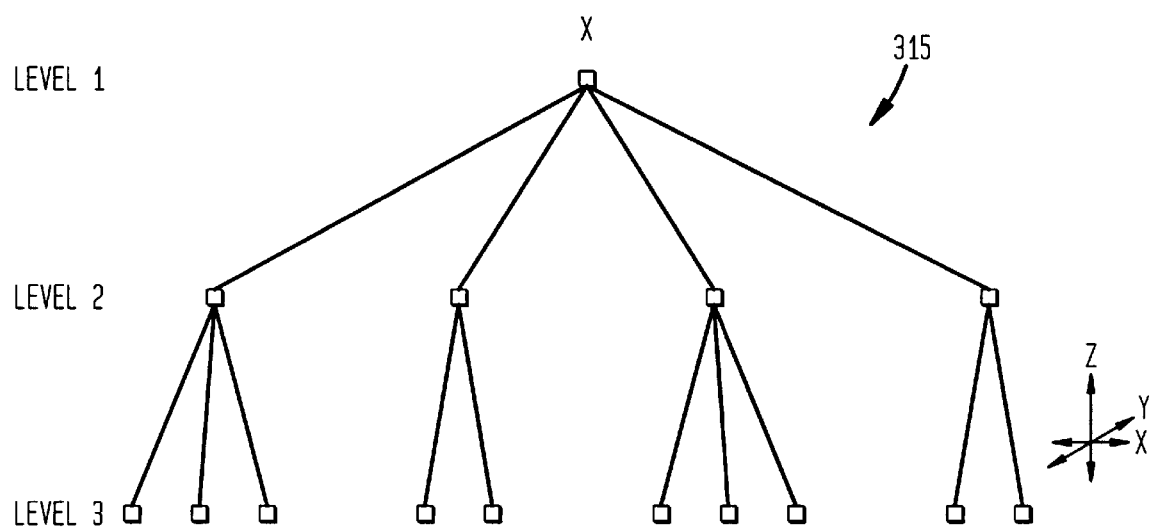

The operation of the partial hierarchy generator 220 is described in further detail below with respect to FIGS. 3A to 3C. The operation of system 200 in permitting a user to navigate through partial hierarchies according to the present invention, is described in flirter detail below with reference to routine 400 in FIGS. 4A and 4B.

4. Partial Hierarchy Generation

Partial hierarchy generator 220 performs a partial hierarchy generator routine 300. In step 310, a number N of partial hierarchy layouts ending at progressively deeper levels are generated based on data 205 and depth 215. Each partial hierarchy layout ends at a different level and covers a number of levels greater than or equal to depth 215. The number N of partial hierarchy layouts needed equals the total number of levels in a complete hierarchy minus depth 215 plus one. Nodes are laid out recursively for each level of a partial hierarchy beginning at the bottommost end level of the partial hierarchy. At each level of the partial hierarchy, position coordinates (e.g. x and z coordinates) are determined for each node.

For example, given a four level hierarchy 100 with a depth 215 that equals three levels, N=4−3+1=2. In this case, partial hierarchy generator 220 generates two partial hierarchies. One partial hierarchy 315, shown in FIG. 3B, covers levels 1–3. The other partial hierarchy 100 covers levels 1–4. If a hierarchy had ten levels (1–10) and depth 215 was set to 3 levels, then eight partial hierarchies are generated covering levels as follows: 1–3, 1–4, 1–5, 1–6, 1–7, 1–8, 1–9, and 1–10.

In step 320, each partial hierarchy layout generated in step 310 is stored as a cache of layouts 230 in any type of memory storage. In particular, each partial hierarchy can be stored in its entirety including higher levels above the levels in a depth that will be actually rendered. Alternatively, only the levels in the depth that will be actually rendered need be stored in cache of layouts 230. For example, in a ten level hierarchy with a depth set to 3 levels, the eight partial hierarchy layouts that are stored can cover levels (excluding unnecessary higher levels) as follows: 1–3, 1–4, 2–5, 3–6, 4–7, 5–8, 6–9, and 7–10.

According to one feature of the present invention, segments of connection lines are included for parent nodes in a bottom level of a partial hierarchy. These segments can be seen in a display view of a partial hierarchy even though they lead to child nodes which lie in deeper levels not included in the partial hierarchy. In this way, the user is provided with contextual information on the relative location of child nodes. These child node connection line segments aid navigation by highlighting to a user where child nodes are in deeper levels not included in the partial hierarchy currently being displayed. Valuable display space does not have to be reserved for the entire child node. FIGS. 21–24 show examples of partial hierarchy display views that have child connection line segments.

Connection lines and other graphical attributes (e.g. node graphical attributes) can be added during rendering. Thus, connection lines between parent and child nodes, and other graphical attributes need not be determined and stored in cache 230. Connection lines between parent and child nodes are drawn from the parent node to the child node based on the location of nodes in the current partial hierarchy.

Connection lines leading from a bottommost level of a partial hierarchy can be generated automatically by examining that partial hierarchy, as well as, the next lowest partial hierarchy. For example, consider when a user starts from the point where the partial hierarchy is four levels deep, and navigates to a partial hierarchy that is five levels deep. When the camera is exactly at the point where z' is 4 (i.e., at level 4), the lines extend straight back from the bottom level nodes. In particular, if a node has coordinates when viewed with a z' of 4 are (x1a, 4) (ignoring the y coordinate), the connection line extends from (x1a, 4) to (x1a, 5). Once the camera has moved to a location where z' is 5, the parent node may have moved to (x1b, 4), and its child node will have been mapped at some point (x2b, 5), and the connection line will extend between them. At an intermediate point, the child node will not have been mapped, and the line will be interpolated. Suppose that at z' of 4.3, the parent node is at (x1c, 4). The other end of the line is interpolated 30% of the way between x1c (the current x coordinate of the parent), and x2b (the location of the child at the first point will be mapped, and the only point available in the cache, since the four level deep partial hierarchy does not have that child positioned.) Thus, the line will extend from point (x1c, 4) to point (x1c+(0.3*(x2b−x1c)), 5).

Figure 3C:
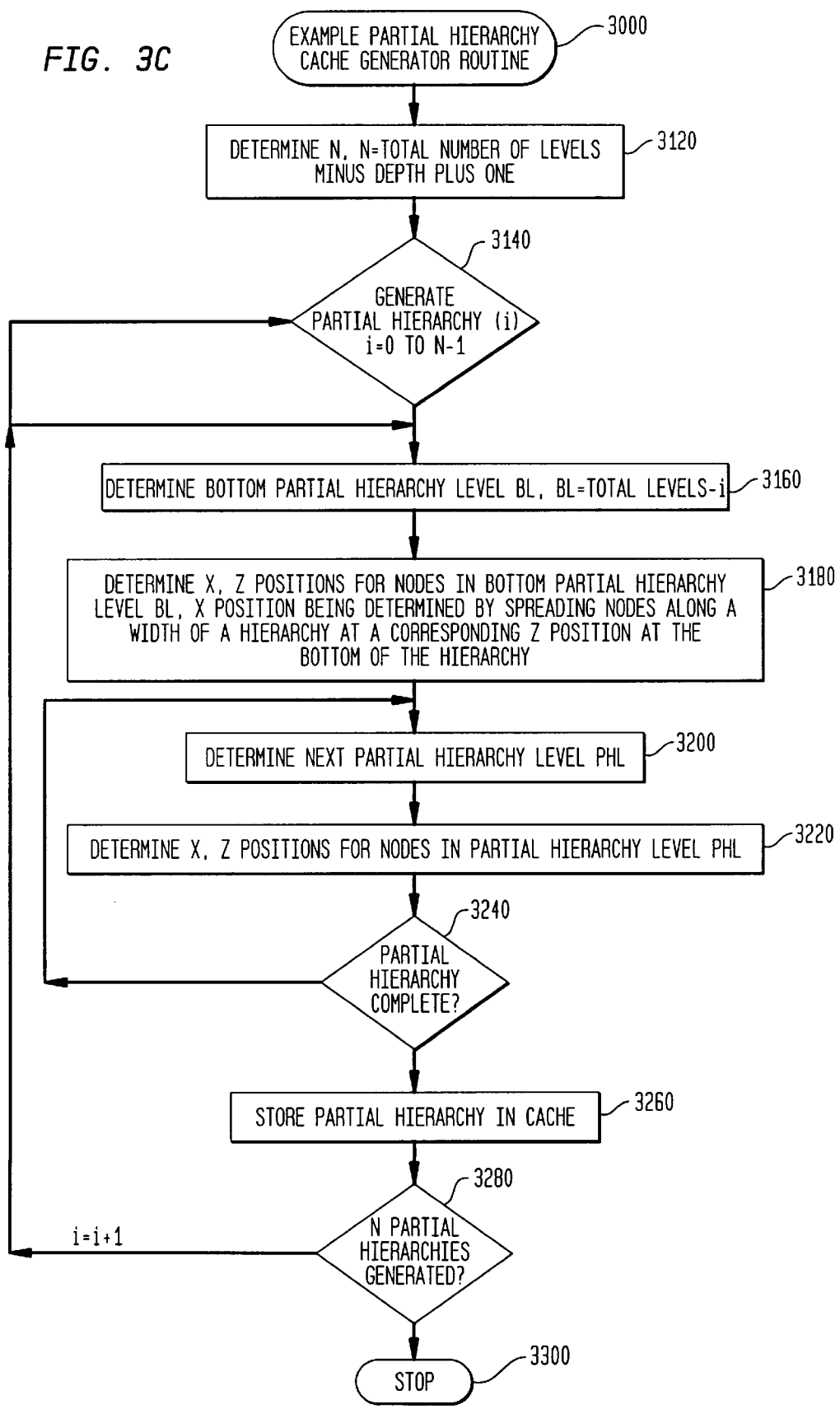

The operation of partial hierarchy generator 220, according to the present invention, is described in further detail with respect to an example routine 3000 shown in FIG. 3C as used to generate the example partial hierarchies 315, 100. In step 3120, partial hierarchy generator 220 determines N, N=Total Number of Levels Minus Depth Plus One. As mentioned above, given a four level hierarchy 100 with a depth 215 that equals two levels, N=4−2+1=3.

Next, partial hierarchy generator 220 performs a loop (step 3140) to generate N partial hierarchies. Loop 3140 repeats steps 3160 to 3280 for I=0 to N−1 to generate each partial hierarchy. For clarity, steps 3160 to 3280 will be described with respect to the specific example N=2 in generating the three level partial hierarchy 315, shown in FIG. 3B.

In step 3160, a bottom partial hierarchy level BL is determined where BL=Total Levels−I. In step 3180, partial hierarchy generator 220 determines x, z positions for nodes in bottom partial hierarchy level BL, e.g. Level 3 in partial hierarchy 315. The x position is determined by spreading nodes along a width w of partial hierarchy 315. The x coordinates are spaced approximately equally across the x coordinate dimension width. Additional spaces can be added to further separate groups of child nodes that share a common respective parent node in Level 2 or above. The z coordinate position lies along a bottom of the hierarchy for bottom partial hierarchy level BL (e.g. level 3 in partial hierarchy 315).

In step 3200, a next partial hierarchy level PHL is determined (e.g. level 2 in partial hierarchy level 315). Partial hierarchy generator 220 determines x, z positions for nodes in the next partial hierarchy level PHL (step 3220). In one example embodiment, the z coordinate position corresponds to the partial hierarchy level PHL. The present invention, however, is not limited to having nodes lying only at partial hierarchy levels. In general, a node can lie any distance above or below a specific level. This can be helpful in accommodating nodes of different sizes.

The x position is determined by spreading nodes along a width w of a hierarchy. In one example, the x coordinate positions of PHL level parent nodes are approximately the average x coordinate positions of corresponding child nodes laid out previously.

Steps 3200 and 3220 are repeated for different partial hierarchy levels until the partial hierarchy is complete (step 3240). A partial hierarchy is complete when the number of levels laid out at least equals the number of levels identified by depth 215. The partial hierarchy is then stored in cache 230 (step 3260). Steps 3160 to 3260 are then repeated until N partial hierarchies are generated (step 3280), and routine 3000 stops (step 3330).

After partial hierarchy generator 220 generates and stores all partial hierarchies in cache 230, navigation can begin.

5. Partial Hierarchy Navigation

Figure 4A:
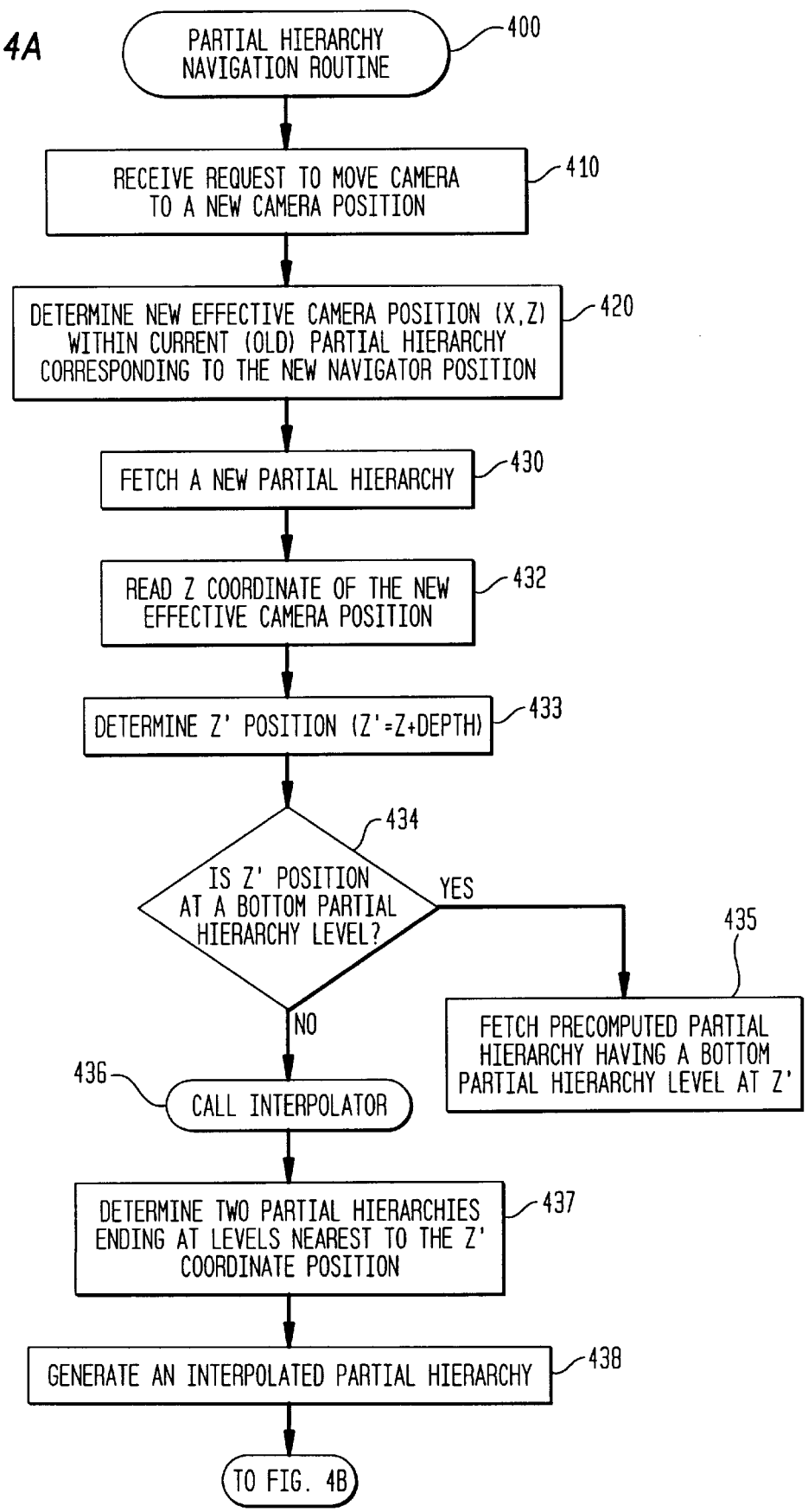
FIGS. 4A and 4B are a flowchart showing a partial hierarchy navigation routine according to the present invention.
Figure 4B:
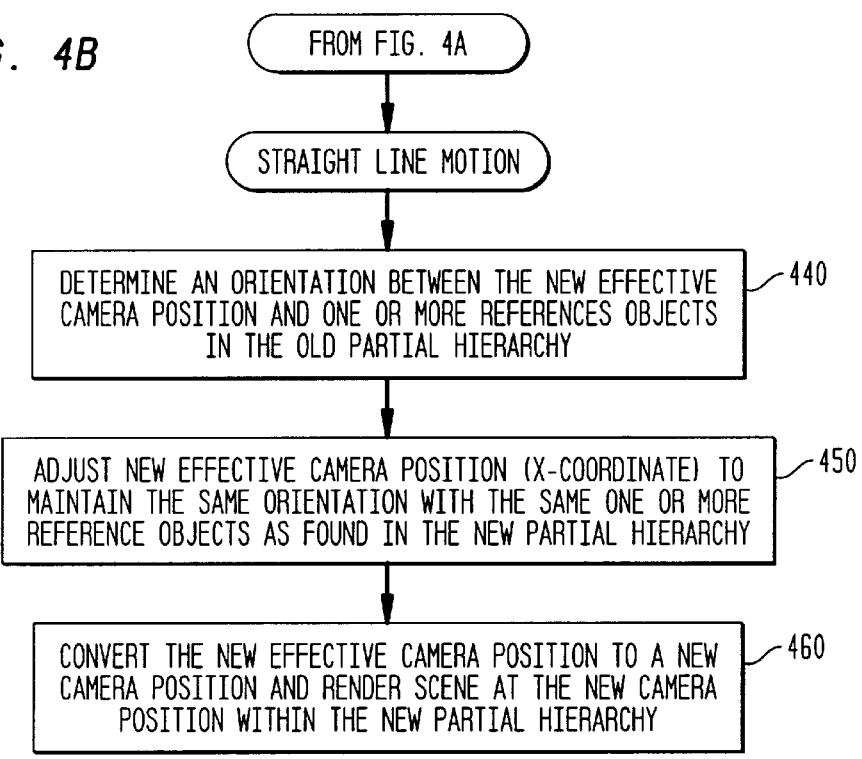

FIGS. 4A and 4B show a routine 400 for navigating through partial hierarchies according to the present invention and will be described with reference to system 200. In step 410, hierarchy manager 210 receives a request to move a camera from a current (old) position on a current partial hierarchy to a new camera position. This request for example can be entered by a user through mouse 260 while flying over the current partial hierarchy. Hierarchy manager 210 then determines a new effective camera position (x,z) within the current partial hierarchy corresponding to the new navigation position (step 420).

A new partial hierarchy is fetched (steps 430 to 438). The partial hierarchy can be fetched from cache 230 or generated by interpolator 280. First, the z coordinate position of the new effective camera position is read (step 432). A z' position is determined by adding the z coordinate of the new effective camera position to depth 215 (step 433).

Hierarchy manager 210 makes a determination on whether interpolation is necessary (step 434). If the z' position determined in step 433 matches any bottom level in a partial hierarchy stored in cache 230 then interpolation is not necessary. In this case, hierarchy manager 210 can fetch the precomputed layout that has a bottommost level matching the z' position (step 435). For example, if the z coordinate is read and matches level 4 of a ten level hierarchy and depth 215 is set to 3 levels (z' position equals level 7), then a partial hierarchy layout ending in the level 7 is fetched from cache of layouts 230. This partial hierarchy layout covers levels 1–7 or alternatively, at least levels 4–7, as described above with respect to the partial hierarchy generator 220.

Interpolation is also not necessary when the z coordinate is above the top level of the hierarchy (the topmost partial hierarchy layout is fetched). Interpolation is also not necessary near the bottom of a hierarchy where the bottom level is visible in the current partial hierarchy layout (the current partial hierarchy layout is used for navigation). Interpolation is also not necessary when the z' coordinate is below the bottom of the hierarchy, in which case the lowest partial hierarchy layout is fetched and used.

Otherwise, interpolation is needed and interpolator 280 called (step 436). Interpolator 280 determines two partial hierarchy layouts in cache 230 that have bottommost levels nearest to the determined z' position (step 437). Interpolator 280 then generates an interpolated partial hierarchy layout (step 438). In the interpolated partial hierarchy layout, the x coordinate positions of each node is determined by interpolating between the x coordinates of corresponding nodes in the two partial hierarchy layouts determined in step 437. This interpolation of the x coordinates is performer in proportion to the relative location of the z' position between the two bottom levels of the two partial hierarchy layouts being interpolated.

In other words, if the effective camera position (z coordinate) is between levels 3 and 4 of a ten level hierarchy (depth 215 set to 3 levels), interpolation is necessary. The z' position (z coordinate plus depth 215) is then between levels 6 and 7. The two partial hierarchy layouts that end at levels 6 and 7 respectively (1–6 and 1–7, or, at least 3–6 and 4–7) are interpolated to generate an interpolated partial hierarchy.

Assume the z coordinate is located at a point 40% of the distance from level 3 to level 4 (or equivalently, that the z' position is located at a point 40% of the distance from level 6 to level 7). The x coordinate for the position of each node in the interpolated partial hierarchy layout is determined by interpolating 40% between the x coordinates of corresponding nodes in the two partial hierarchy layouts ending in levels 6 and 7 respectively.

Consider first and second partial hierarchy layouts that cover hierarchy levels 3–6 and 4–7 respectively. The x coordinates for nodes in levels 4, 5, and 6 of the interpolated partial hierarchy layout are determined by interpolating positions 40% between the x coordinate positions of corresponding nodes in levels 4, 5 and 6 of the first and second partial hierarchy layouts. Note once a camera position moves further down, levels 5 to 7 will be interpolated from the 4–7 partial hierarchy and levels 5 to 7 of a successive 5–8 partial hierarchy.

In the above example, each partial hierarchy has a number of levels equal to depth plus one level. Alternatively, to better cover nodes near a camera position, each partial hierarchy, after the first partial hierarchy, can be generated to include a number of levels equal to depth plus two levels. The previous example, would then be modified such that first and second partial hierarchy layouts cover hierarchy levels 2–6 and 3–7 respectively for a point where the effective camera position is at 3.4. At this camera position 3.4, the nodes at level 3 may be behind the effective camera position. However, the nodes have some depth, and may still be partially in the screen. Furthermore, even if they aren't visible, the lines leading from level 3 to level 4 are in the screen. In order to draw them, it must be known where the level 3 nodes are, therefore, partial hierarchies covering levels 2–6 and 3–7 are needed to draw these additional lines, if desired.

Using a partial hierarchy layout during navigation, as described above, allows a greater number of nodes to be seen in a display view as room is not made for lower level children lying beyond a depth of interest to the user. Interpolated partial hierarchy layouts allow a user to fly smoothly through successive display views of partial hierarchies.

a. Straight Line Motion

As shown in FIG. 4B, once a partial hierarchy has been fetched (steps 430–438), steps 440 to 460 are added to maintain apparent straight line motion across successive partial hierarchies. In step 440, hierarchy manager 210 determines an orientation between the new effective camera position (as determined in step 420) and one or more reference objects in the old partial hierarchy. An example of determining an orientation with respect to two reference objects is described below with reference to FIG. 5A. An example of determining an orientation with respect to one reference object is described below with reference to FIG. 5B. The present invention is not limited to these two examples. Given this description a person having ordinary skill in the art can use other orientations based on one, two, three, four, or more reference objects.

In step 450, a new x coordinate for the new effective camera position is determined. The new x coordinate maintains in the new partial hierarchy the orientation determined in step 440. In particular, an x coordinate position is determined that maintains the same orientation with the one or more reference objects as found in the new partial hierarchy.

Finally, the new effective camera position is converted to a camera position. Viewer 250 then renders a display view of the new partial hierarchy at the camera position (step 460).

b. Straight Line Motion Based on Two Objects

Figure 5A:
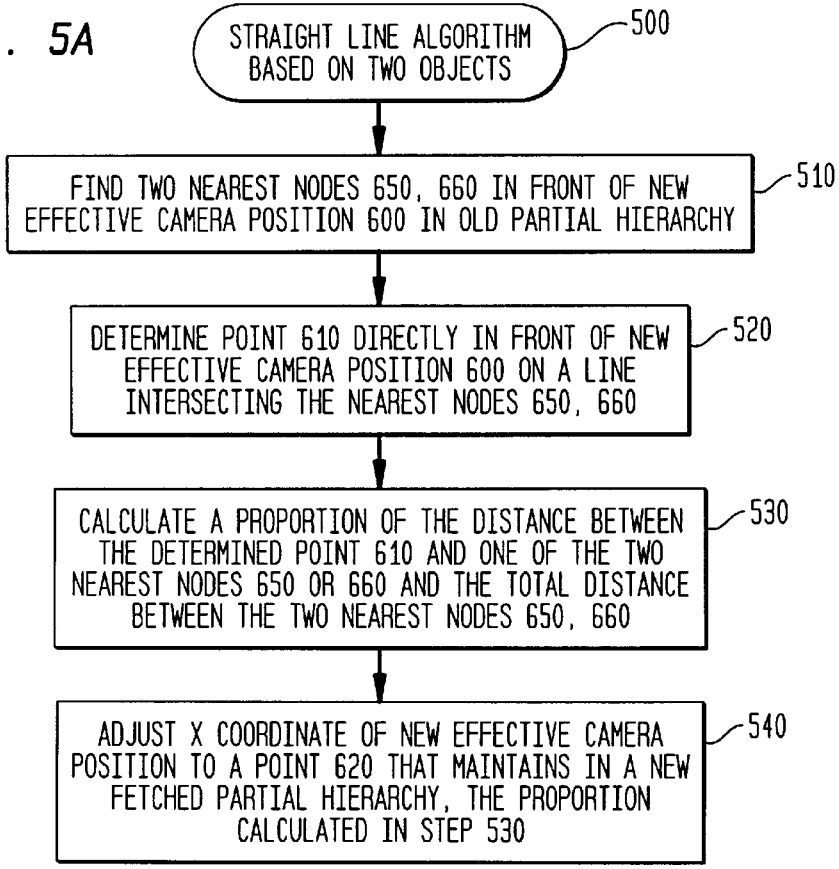
FIG. 5A is a flowchart of an algorithm that maintains straight line motion based on two reference objects, according to the present invention.

As mentioned earlier, during free-form navigation it is desirable to maintain an appearance of approximately straight line motion. FIG. 5A is a flowchart of a straight line motion routine 500 that maintains an orientation based on two reference objects. Any object can be used as a reference object including, but not limited to, nodes. FIGS. 6A and 6B illustrate a schematic example of how routine 500 maintains an orientation between successive (e.g. old and new) partial hierarchies. For clarity, routine 500 will be described with reference to the specific example in FIGS. 6A and 6B. This example is not intended to limit the present invention.

As shown in FIG. 5A, hierarchy manager 210 first finds two nearest nodes 650, 660 in front of new effective camera position 600 in an old partial hierarchy (step 510). Note if two nearest nodes cannot be found, or if the camera position is on an edge of a hierarchy, then the straight line algorithm 500' based on one nearest object is used as described below. Hierarchy manager 210 then determines point 610 directly in front of new effective camera position 600 on a line intersecting the nearest nodes 650, 660 (step 520). For example, point 610 can be determined by copying the x coordinate of new effective camera position 600 and copying the z coordinate of either node 650 or 660.

In step 530, hierarchy manager 210 calculates a proportion (or a ratio) of the distance between the determined point 610 and one of the two nearest nodes 650 or 660 and the total distance between the two nearest nodes 650, 660. In the example shown in FIG. 6A, the proportion of the distance between the determined point 610 and node 650 and the total distance between the nodes 650 and 660 is 25% (or equivalently, a ratio of ¼).

As shown in FIG. 6B, in a new fetched partial hierarchy layout nodes 650 and 660 are separated by a greater distance along the x coordinate. In step 540, hierarchy manager 210 adjusts the x coordinate of new effective camera position 600 to a point 620 that maintains in the new fetched partial hierarchy, the proportion calculated in step 530. In other words, point 620 has an x coordinate position that is spaced from node 650 in the new partial hierarchy by a distance that is 25% of the total distance between nodes 650 and 660 in the new fetched partial hierarchy. The new fetched partial hierarchy is a successive layout for the new effective camera position 600 fetched from either cache 230 or returned by interpolator 280 as described above.

c. Straight Line Motion Based on One Object

FIG. 5B is a flowchart of a straight line motion routine 500' (similar to routine 500 described in detail above) that maintains an orientation based on one reference object. Any object can be used as a reference object including, but not limited to, a node.

As shown in FIG. 5B, hierarchy manager 210 first finds a nearest node 650 in front of new effective camera position 600 in an old partial hierarchy (step 510'). Hierarchy manager 210 then determines point 610 directly in front of new effective camera position 600 on a line intersecting the nearest nodes 650, 660 (step 520'). For example, point 610 can be determined by copying the x coordinate of new effective camera position 600 and copying the z coordinate of node 650.

Figure 6C:
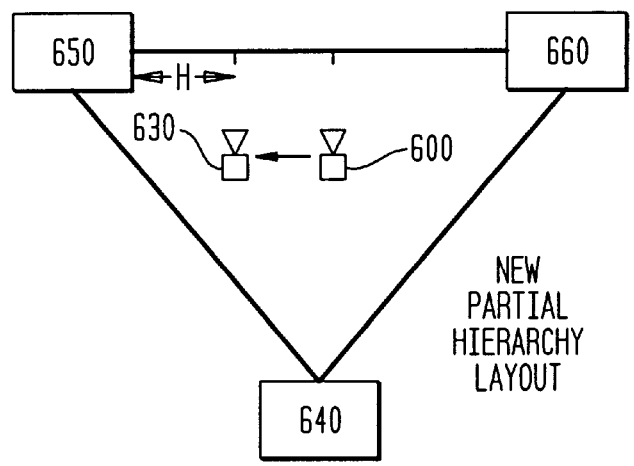
FIG. 6C illustrates an example of straight line motion based on one reference node for a navigation path extending between camera positions on respective old and new partial hierarchy layouts.

In step 530', hierarchy manager 210 calculates a horizontal displacement distance H between the determined point 610 and the nearest node 650 (see FIG. 6A). As shown in FIG. 6C, in a new fetched partial hierarchy layout node 650 is separated by a greater distance along the x coordinate. In step 540', hierarchy manager 210 adjusts the x coordinate of new effective camera position 600 to a point 630 that maintains in the new fetched partial hierarchy, the horizontal displacement distance H calculated in step 530'. In other words, point 630 has an x coordinate position that is spaced from node 650 in the new partial hierarchy by the horizontal displacement distance H in the new fetched partial hierarchy. The new fetched partial hierarchy is a successive layout for the new effective camera position 600 fetched from either cache 230 or returned by interpolator 280 as described above.

6. Zooming Navigation

Figure 7:
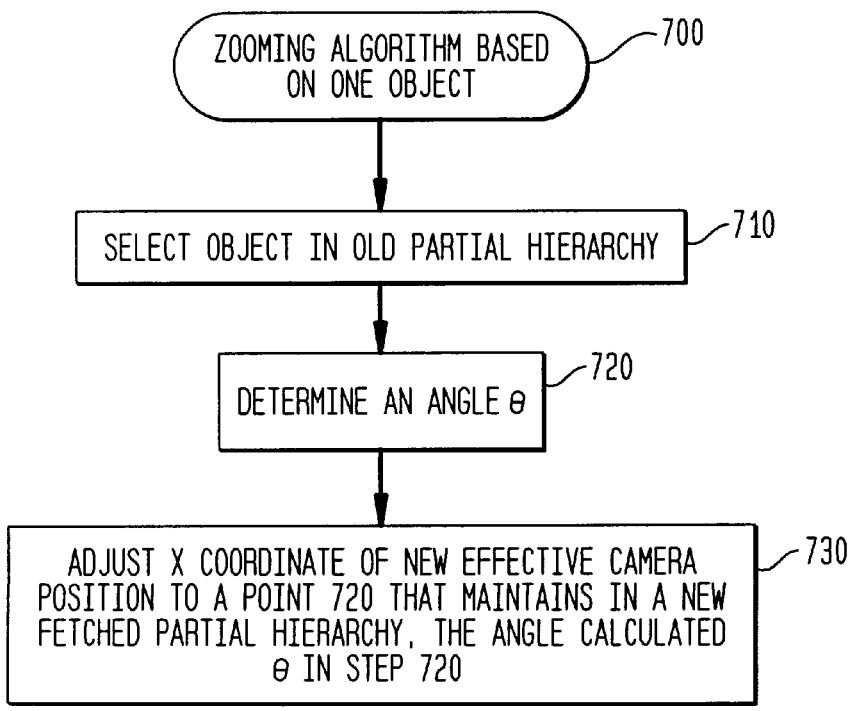
FIG. 7 is a flowchart of an algorithm for zooming based on one reference object, according to the present invention.
Figure 8A:
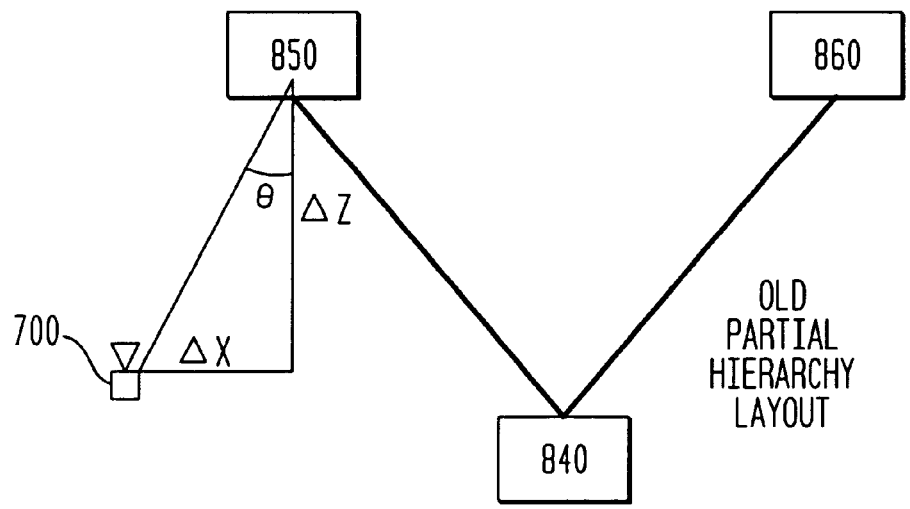
FIGS. 8A and 8B illustrate an example of zooming based on one reference node for a navigation path extending between camera positions on respective old and new partial hierarchy layouts.
Figure 8B:
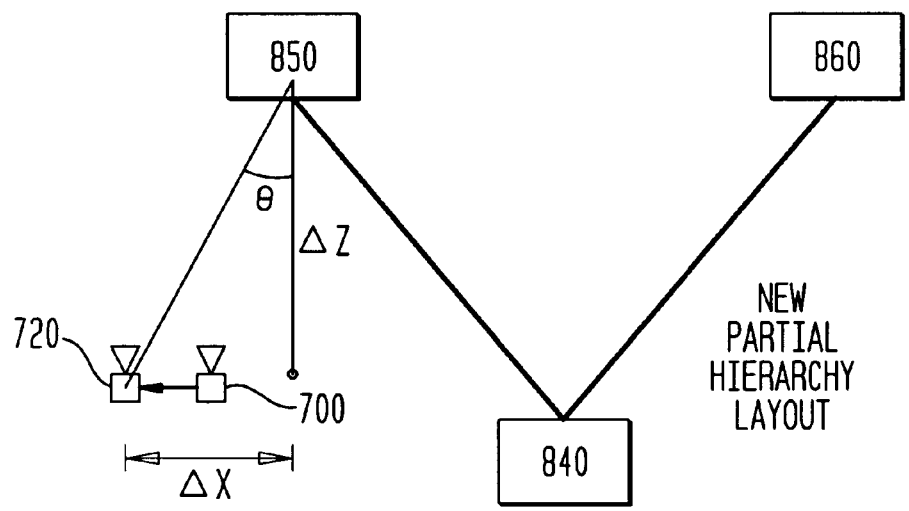

In addition to free-form navigation, a zooming type of navigation is provided through partial hierarchies. Zooming allows a user to zoom toward or away from a selected object. FIG. 7 is a flowchart of a zooming algorithm 700 that maintains an orientation during zooming based on one reference object FIGS. 8A and 8B illustrate a schematic example of how routine 700 maintains an orientation during zooming between successive (e.g. old and new) partial hierarchies. For clarity, routine 700 will be described with reference to the specific example in FIGS. 8A and 8B. This example is not intended to limit the present invention.

As shown in FIG. 7, the user selects an object to zoom to from a new effective camera position 700 in an old partial hierarchy (step 710). Hierarchy manager 210 then determines an angle θ between position 700 and node 850 (step 720). For example, angle θ can be determined from the arctangent of the difference in x coordinate position ($\Delta x$) between position 700 and the position of node 850 divided by the difference in z coordinate position ($\Delta z$) between position 700 and the position of node 850.

As shown in FIG. 8B, in a new fetched partial hierarchy nodes 850 and 860 can be separated by a greater distance along the x coordinate. In step 730, hierarchy manager 210 adjusts the x coordinate of new effective camera position 700 to a point 720 that maintains in the new fetched partial hierarchy layout, the angle θ between point 720 and node 850 calculated in step 720. The new fetched partial hierarchy is a successive layout for the new effective camera position 700 fetched from either cache 230 or returned by interpolator 280 as described above.

7. Example Display Views

The operation and advantages of the present invention is further illustrated in the series of display views shown in FIGS. 9 to 24. To make comparison easier, each of the display views in FIGS. 9 to 24 are drawn using a common data set example. This data set consists of census data. Records have data attributes for people in the census. These data attributes include: age, income, and education. The complete and partial hierarchies shown in FIGS. 9 to 24 visually represent a decision tree classifier that is used to classify the census data. In this example, the decision tree classifier determines whether people make less than or greater than $50,000. Using a hierarchy to visualize a decision tree classifier is described in a co-pending U.S. patent application, "Method, System and Computer Program Product for Visulizing a Decision Tree Classifier" (filed concurrently herewith and incorporated by reference herein).

Figure 28:
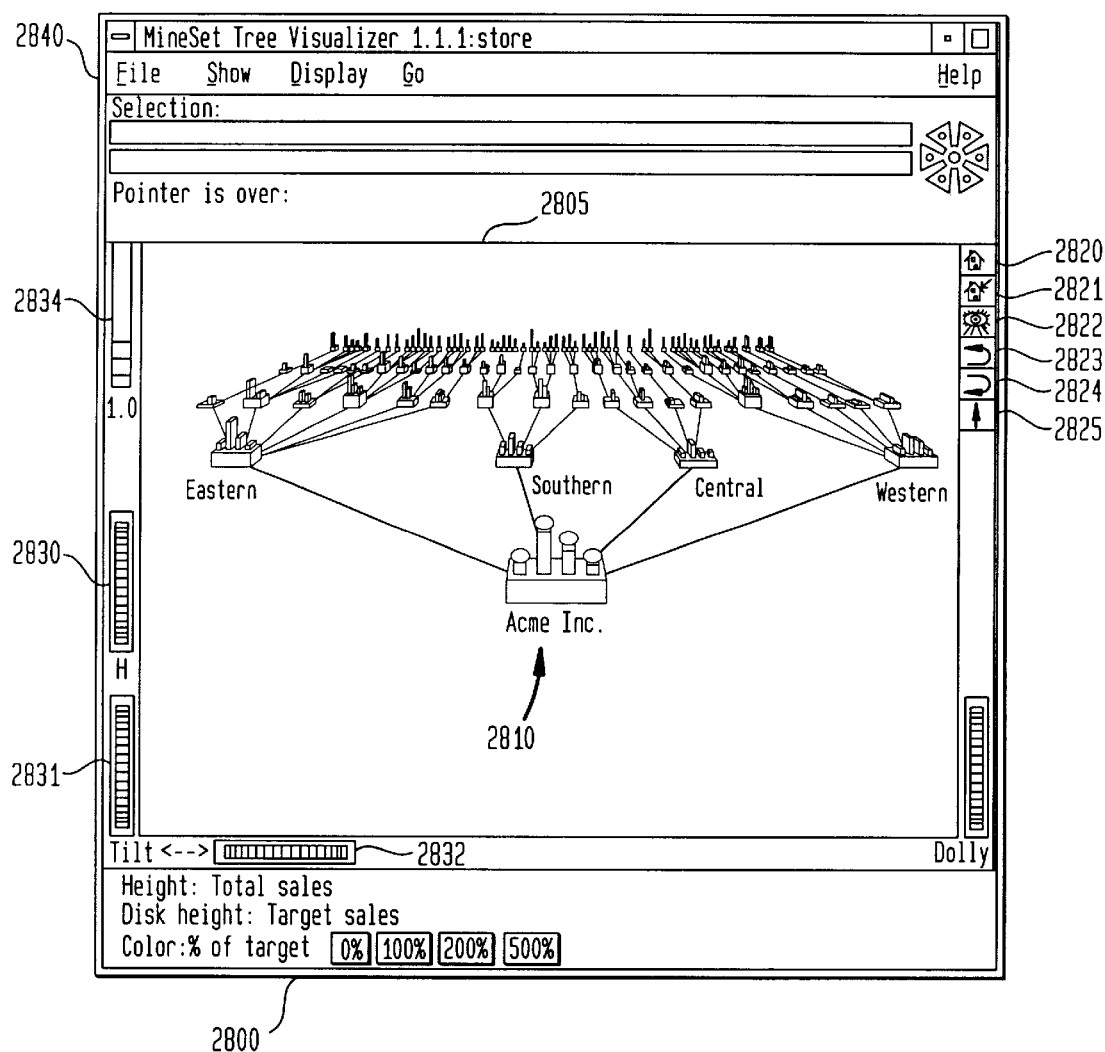
FIG. 28 is a screen display of an example hierarchy or tree data visualization tool for implementing the present invention.

Alternatively, the complete and partial hierarchies in FIGS. 9 to 24 can directly represent the data set itself, as shown, for example, in FIG. 28 and described in earlier U.S. Pat. Nos. 5,555,354 and 5,528,735 (both of which are incorporated herein by reference).

FIGS. 9 to 12 illustrate the limitations of generating display views based on a complete hierarchy layout. FIG. 9 shows a display view of a complete hierarchy with artificial perspective turned off. This view of the complete hierarchy is difficult for a user to interpret as useful information is not visible. FIG. 10 shows a display view taken from the root node at the top of the complete hierarchy in FIG. 9. Artificial perspective is turned off and only a couple of nodes are clearly visible. Only a limited amount of the structure of the hierarchy can be seen.

Figure 12:
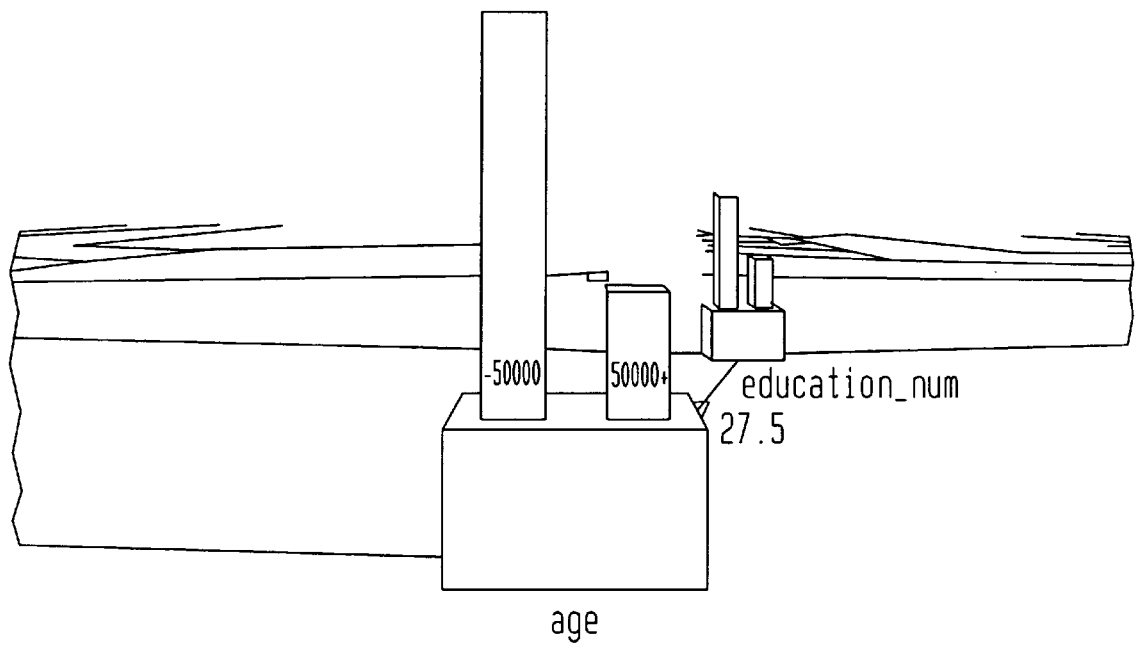

FIG. 11 is similar to FIG. 9, except that artificial perspective is turned on allowing more nodes, connection lines, and structures to be viewed. The nodes of the complete hierarchy are very small, however, making it difficult for a user to discern detail. In FIG. 12, artificial perspective is turned on and the complete hierarchy of FIG. 11 is viewed from the root node. Because of the artificial perspective, more nodes and structure in the hierarchy can be seen in FIG. 12 than in FIG. 10. Nevertheless, because room must be made for nodes in the deeper levels of the hierarchy, only a few nodes can be seen in the foreground.

Figure 13:
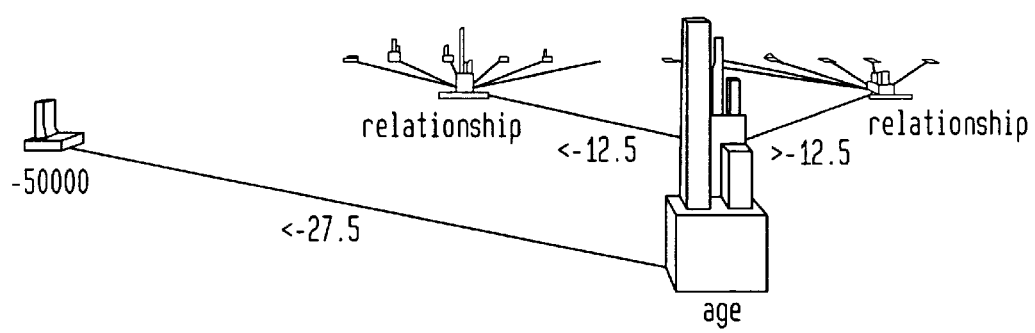
FIGS. 13 and 14 are example display views of a partial hierarchy drawn based on a partial hierarchy layout generated according to the present invention.

FIG. 13 shows a display view of an entire partial hierarchy according to the present invention. The partial hierarchy was generated based on a complete hierarchy having 10 levels. The partial hierarchy was further generated using a depth 215 equal to four levels. Because room did not have to made for nodes in levels 5 to 10, more nodes and structure in levels 1 to 4 can be seen in detail. Artificial perspective is added to further compress nodes in the x coordinate dimension as a function of the respective z coordinate position of each node.

Figure 14:
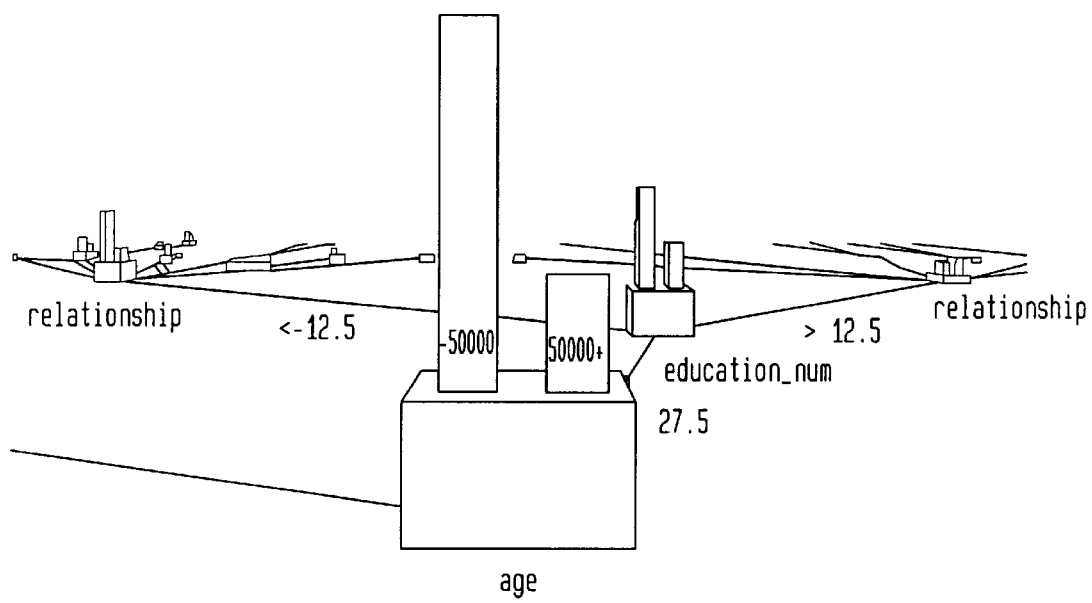

FIG. 14 shows a display view of the partial hierarchy of FIG. 13, except the display view is taken from a root node. Much more structure and detail is visible in the partial hierarchy shown in FIG. 14 than in the complete hierarchy shown in FIG. 12, even though both use artificial perspective.

Figure 15:
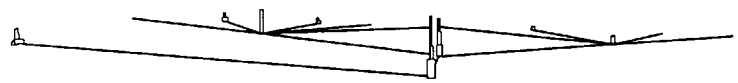
FIG. 15 is an example display view of a hierarchy drawn based on a complete hierarchy layout but having hidden levels.
Figure 16:
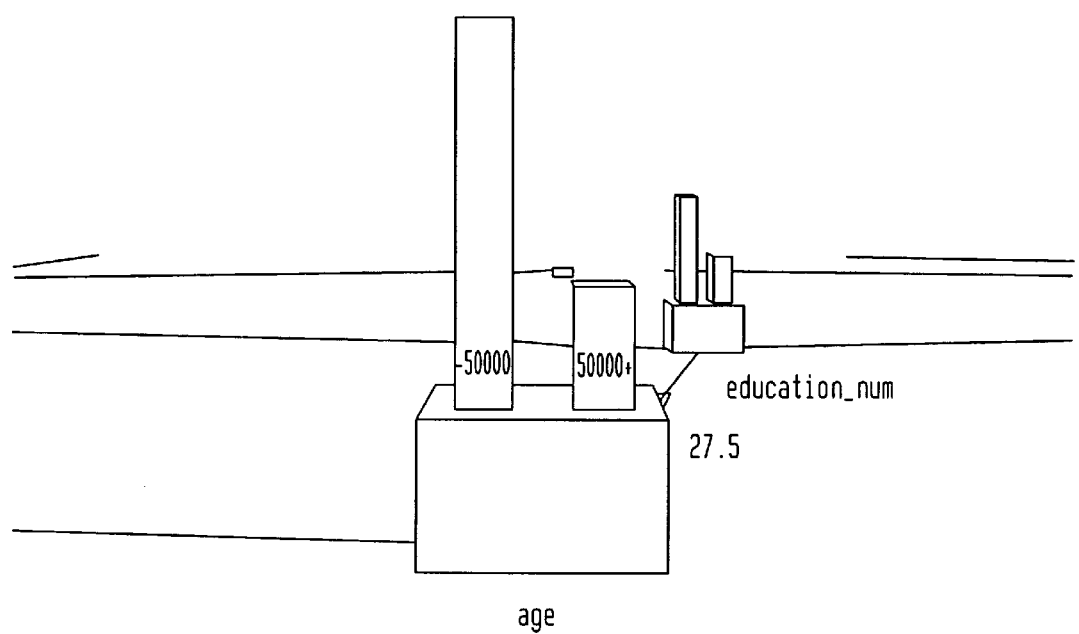
FIG. 16 is an example display view taken from a root node of a hierarchy drawn based on a complete hierarchy layout but having hidden levels.
Figure 17:
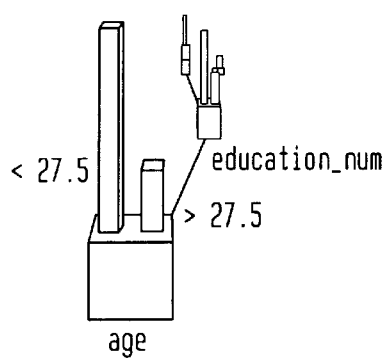
FIGS. 17, 18, 19, and 20 are successive display views of partial hierarchies displayed during navigation, according to the present invention.
Figure 18:
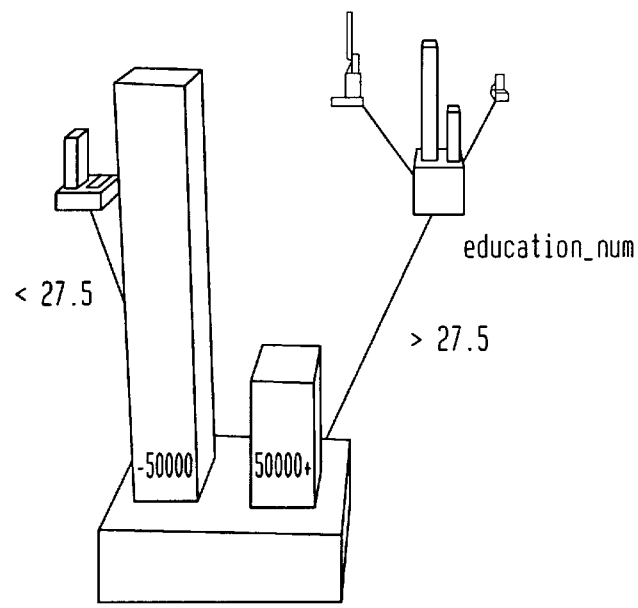
Figure 19:
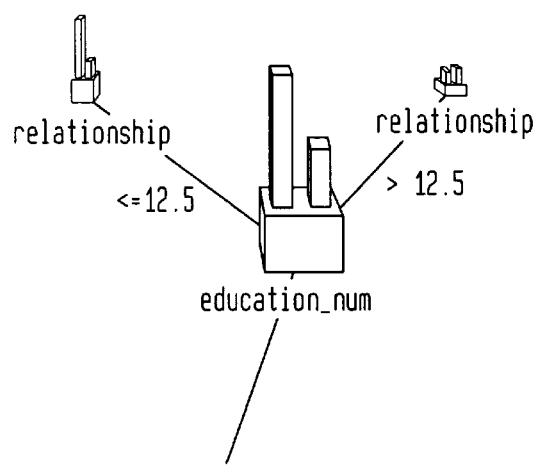

For comparison purposes, FIG. 15 shows a display view of a complete hierarchy where deeper levels, i.e., levels 5 to 10, are hidden but still taken into account in generating the hierarchy layout. FIG. 16 is similar to FIG. 15 except the display view is taken from a root node. These deeper levels are hidden by not displaying them during rendering. As evident by comparing FIGS. 15 and 16 with FIGS. 13 and 14, display views based on partial hierarchies generated according to the present invention provide more useful information regarding hierarchy structure and detail than display views which merely hide deeper levels.

Figure 20:
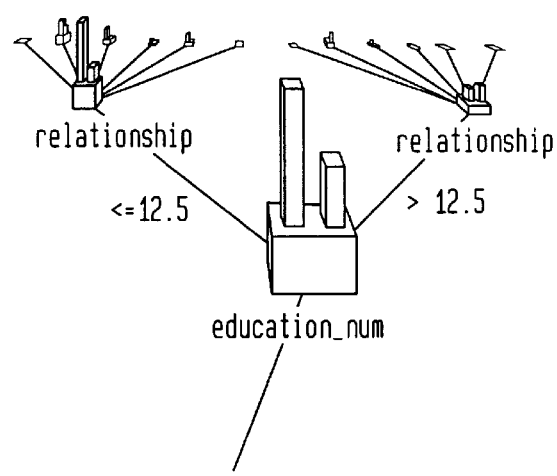

FIGS. 17–20 illustrate navigation through successive partial hierarchies according to the present invention. FIG. 17–20 further illustrate the straight line motion that is maintained during navigation in the present invention as described above with respect to FIGS. 5–8b. In particular, FIGS. 17–20 illustrate a series of successive display views where a camera position moves from a point in front of a root parent node (e.g., age node) to a child node (e.g., education node). As evident from comparing FIGS. 17–20, as the camera position moves forward towards the education node, subnodes (that is, child nodes of the education node) separate smoothly to make room for subnodes in deeper levels not yet included in the partial hierarchy. For instance, as shown in FIG. 20, as the camera position nears the two subnodes labeled "relationship," these relationship nodes have separated such that room is made for the children of the relationship nodes.

Figure 21:
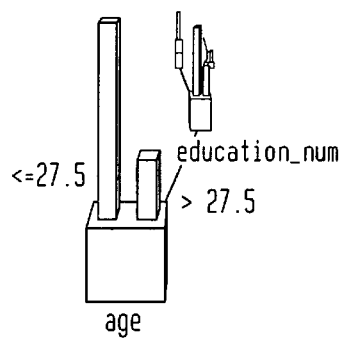
FIGS. 21, 22, 23, and 24 are successive display views of partial hierarchies displayed during navigation, according to the present invention, where child connection lines are shown.
Figure 22:
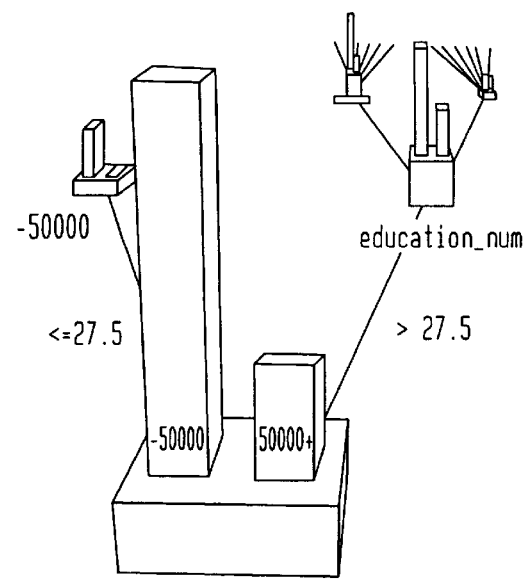
Figure 23:
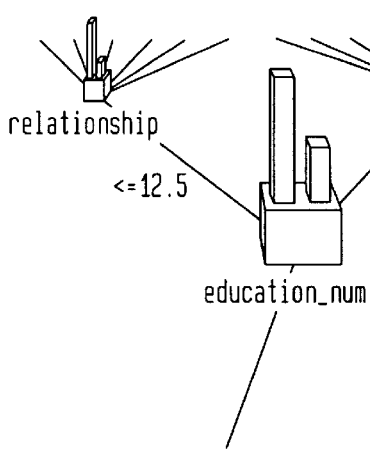
Figure 24:
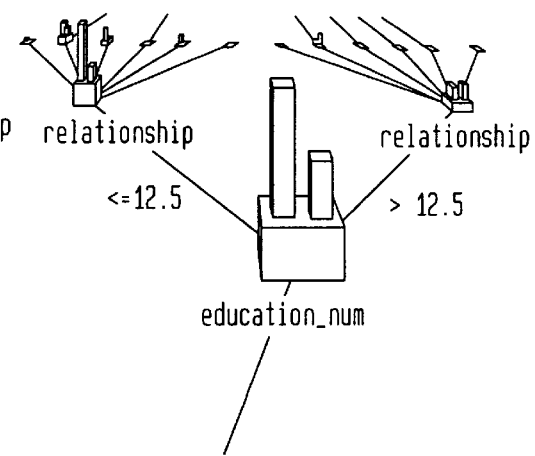

FIGS. 21–24 show display views identical to those in FIGS. 17–20 described above, except that segments of child connection lines are shown extending from the bottom level of the partial hierarchy. In FIG. 21, the segments head straight back and overlap. The segments gradually move further apart (FIGS. 22–23), until the segments are at the right position for the connecting subnodes (e.g., the children of the relationship nodes) to appear (FIG. 24). These subnodes in turn have new segments extending from the bottom level of the partial hierarchy in FIG. 24.

8. Mapping Between a 2D Overview and a 3D Partial Hierarchy

According to another feature of the present invention, mapping is provided between an overview window and a partial hierarchy window. As shown in the example of FIG. 25, an overview window 2500 shows a two-dimensional representation of the complete hierarchy.

A partial hierarchy window shows a partial hierarchy generated as described above. Since the overview window shows a two dimensional representation of the complete hierarchy and the partial hierarchy window (or main window) shows a three-dimensional partial hierarchy with a different layout, points in one window don't necessarily correspond to points in the other window.

Accordingly, the present invention provides an overview mapping module 257 that maps camera positions between an overview window and a partial hierarchy window (and vice versa). In the present invention, when a user navigates through a 3D partial hierarchy in a main window, the current effective camera position is shown in the overview. Conversely, it is possible to click with the mouse on any location in the overview, and the camera will navigate in the main window to that effective camera position. This mapping capability involves determining an orientation with respect to one or more reference objects similar to the routines 500, 500', and 700 described above with respect to free-form and zooming navigation.

Figure 25:
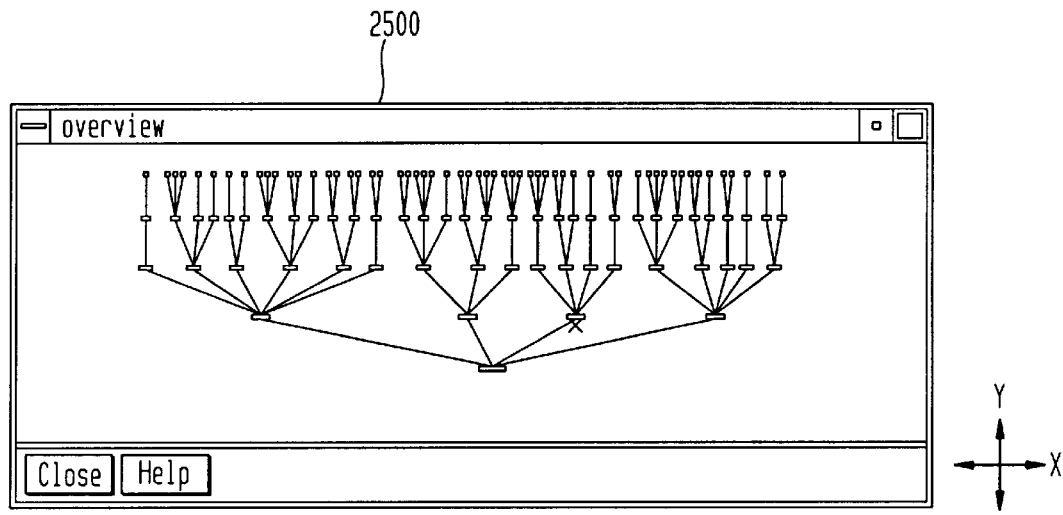
FIG. 25 shows an example 2D overview window according to the present invention.

In FIG. 25, the "X" in the Overview window shows the effective camera position. The Overview helps track location and viewpoint in the entire scene. It also helps a user move quickly to a specific node. For example, a three-button mouse can enter a user's navigation selections. To select an object in the Overview and have the main view zoom to it, left-click that object This is similar to left-clicking on the object in the main view. Middle-clicking anywhere in the overview zooms the camera viewpoint to that location, even if no object is at that point.

Figure 26:
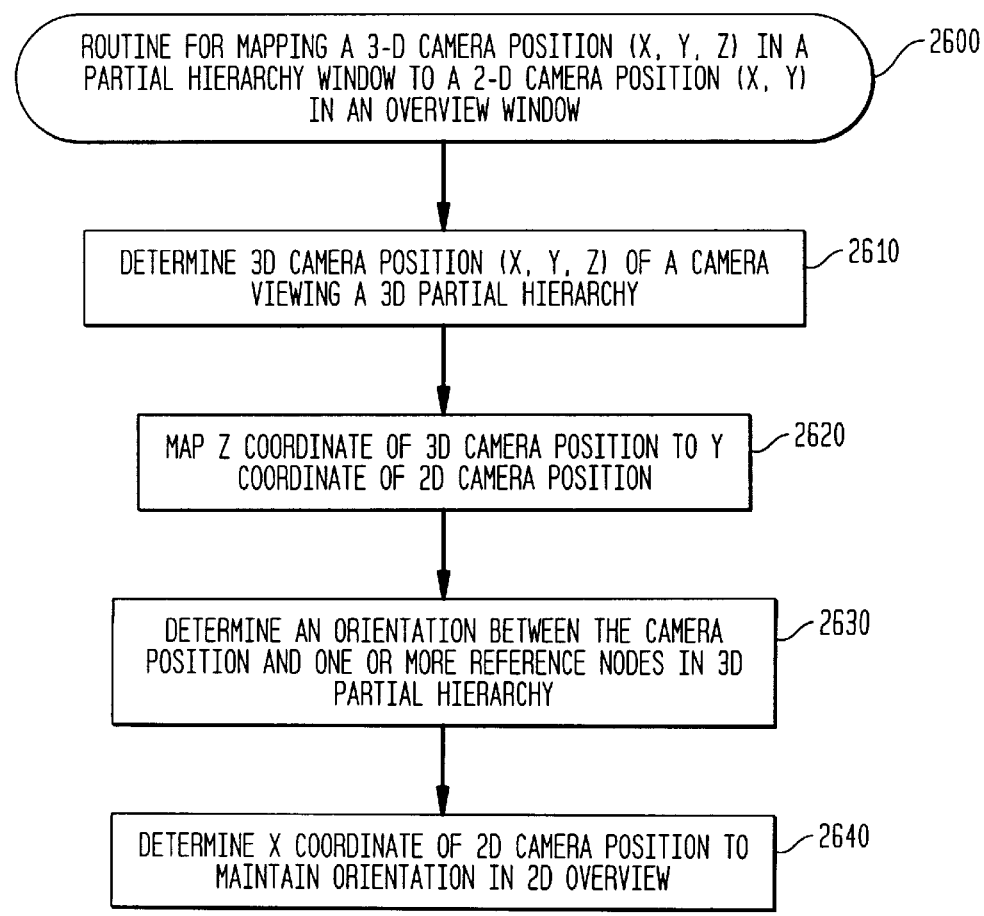
FIG. 26 shows a routine for mapping between a 3D partial hierarchy and a 2D overview according to the present invention.

FIG. 26 is a flowchart of a routine 2600 for mapping a 3-D camera position (x,y,z) in a partial hierarchy window to a 2-D camera position (x,y) in an overview window, according to the present invention. Routine 2600 can be implemented in viewer 250, i.e., as an overview map module 257, primarily as software, firmware, hardware, and any combination thereof.

In step 2610, viewer 250 determines a 3D camera position (x,y,z) of a camera viewing a 3D partial hierarchy. Next, overview map module 257 maps the z coordinate of the 3D camera position to a y coordinate of 2D camera position (step 2620).

To determine the corresponding x coordinate of the 2D camera position, overview map module 257 determines an orientation between the 3D camera position and one or more reference nodes in the 3D partial hierarchy (step 2630). Overview map module 257 then determines the x coordinate of the 2D camera position to maintain the orientation (determined in step 2630) in the 2D overview (step 2640).

Orientation in step 2630 is determined with respect to one or more reference objects similar to the routines 500, 500', and 700 described above with respect to straight line motion. For example, when two reference nodes are used to determine an orientation, two reference nodes in front of the 3D camera position are found. A point directly in front of the 3D camera position on a line intersecting the two reference nodes is determined. Next, a proportion of the distance between the determined point and one of the two nearest nodes, and the total distance between the two nearest nodes is determined. The x coordinate of the 2D camera position is then determined as the x coordinate of the point in the 2D overview that maintains in the 2D overview the proportion calculated above with respect to the 3D partial hierarchy. In other words, an x coordinate is determined in the 2D overview, where the proportion of the distance between the determined x coordinate and one of the two nearest nodes in the 2D overview, and the total distance between the two nearest nodes in the 2D overview matches the same proportion determined with respect to the 3D partial hierarchy.

Likewise, when one reference node is used to determine an orientation, one reference node (e.g. a nearest node) in front of the 3D camera position is found. A displacement distance is determined between the 3D camera position and the reference node. For example, a horizontal displacement can be determined from the difference in x coordinate positions between the 3D camera position in the partial hierarchy and the position of the reference node. The x coordinate of the 2D camera position is then determined as the x coordinate of the point in the 2D overview that maintains in the 2D overview the displacement distance calculated above with respect to the 3D partial hierarchy. In other words, an x coordinate is determined in the 2D overview, where a horizontal displacement distance between the determined x coordinate and the reference node in the 2D overview matches the same horizontal displacement distance determined with respect to the 3D partial hierarchy.

Likewise, when an angular orientation with respect to one reference node is used, one reference node (e.g. a nearest node) in front of the 3D camera position is found. An angle $\theta$ is determined between the 3D camera position and the reference node. For example, angle $\theta$ can be determined from the arctangent of the difference in x coordinate positions between the 3D camera position in the partial hierarchy and the position 6f the reference node divided by the difference in z coordinate position between the 3D camera position and the position of the reference node, e.g $\theta$=arctangent ($\Delta x/\Delta z$). The x coordinate of the 2D camera position is then determined as the x coordinate of the point in the 2D overview that maintains in the 2D overview the angle $\theta$ calculated above with respect to the 3D partial hierarchy. In other words, an x coordinate is determined in the 2D overview, where the angle $\theta$ between the determined x coordinate and the reference node in the 2D overview matches the same angle $\theta$ determined with respect to the 3D partial hierarchy.

Similar steps are performed by a viewer 250 to map between a 2D overview of a complete hierarchy and a 3D partial hierarchy. First, a 2D camera position (x,y) of a camera viewing the 2D overview of a complete hierarchy is determined. Then, a y coordinate of the 2D camera position is mapped (e.g. copied) to a z coordinate of a 3D camera position.

Next, viewer 250 determines an orientation between the 2D camera position and at least one reference object in the 2D overview of a complete hierarchy. For example, the orientation can be based on two reference nodes, one reference node, or an angular orientation, as described above with respect to FIG. 26. Finally, viewer 250 determines an x coordinate of the 3D camera position that maintains with respect to the 3D partial hierarchy, the orientation determined in the orientation determining step.

9. Marking

In a static layout of a complete hierarchy, it is possible to place a mark at a specific (x,y,z) coordinate. In other words, only an absolute coordinate position (x,y,z)=(10, 2, 5) need be stored for a mark. During rendering, a mark would then be displayed at that absolute position. In the present invention, however, where different partial hierarchies are generated, an absolute coordinate position is not always meaningful because as a camera position moves in the z dimension, the x coordinates of objects in partial hierarchies change.

According to other features of the present invention, a user is permitted to mark selected objects or specific locations in a displayed partial hierarchy. To reference a mark for a selected object, relative coordinates are used The relative coordinates identify a location of the mark relative to a selected object.

To mark a specific location, absolute coordinates are stored for a mark. Absolute coordinates for a mark, however, are only directly interpreted when a camera position is at similar coordinates. Otherwise, the absolute coordinates are interpreted by first transforming the absolute coordinates for a selected location to a coordinate system at a current camera position. For example, x and y coordinates of a stored marked location are directly interpreted only when the camera position is at the same z coordinate. Otherwise, when the camera position is not equal to the z position of an absolute mark coordinate, the x and y coordinate are transformed using a free-form navigation algorithm based on one or two reference objects (e.g., based on routines 500 and 500' described above) and/or artificial perspective.

10. Example GUI Computer Environment

Figure 27:
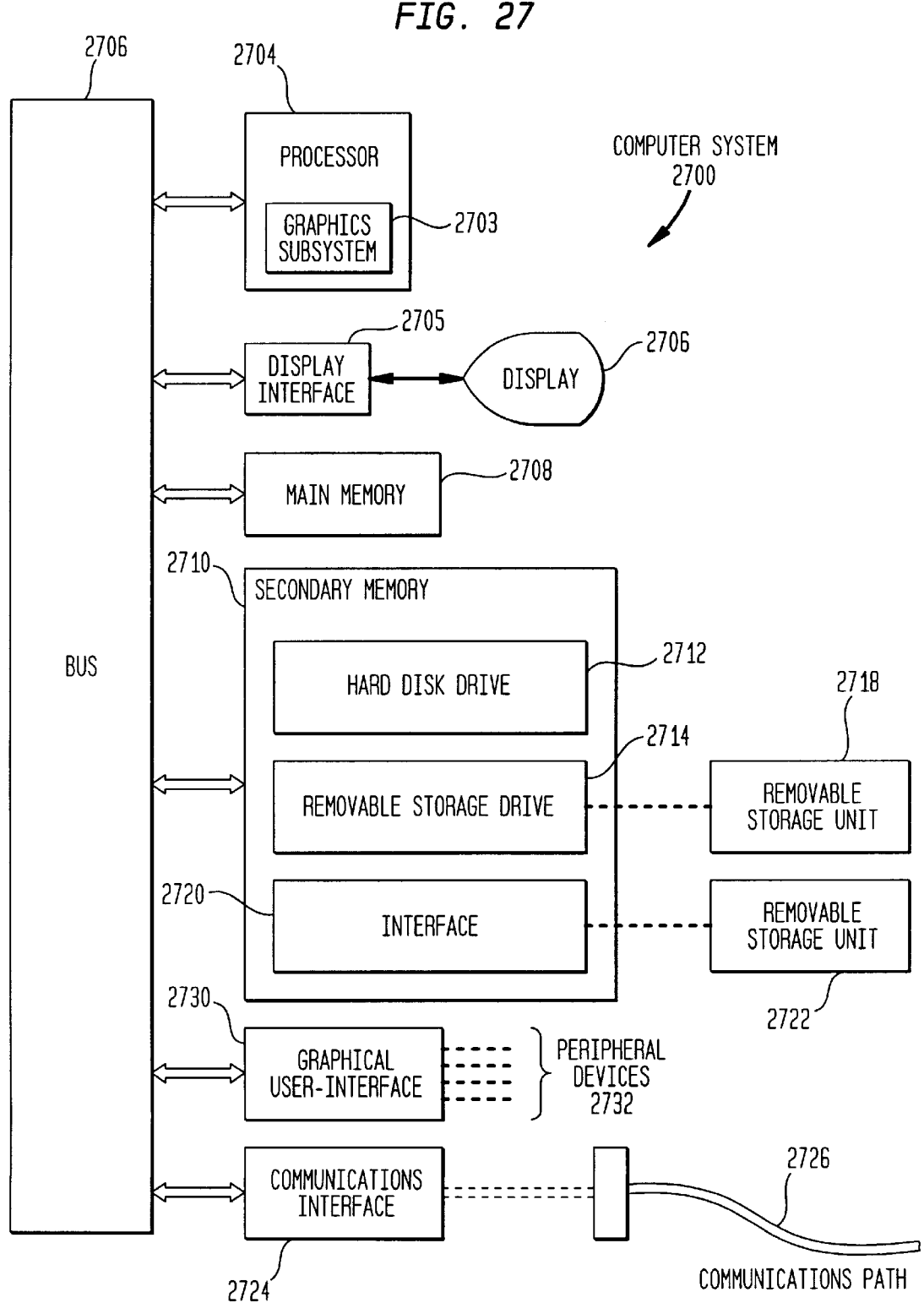
FIG. 27 shows an example graphical user-interface computer system for implementing a hierarchy data visualization tool according to the present invention.

FIG. 27 is a block diagram illustrating an example environment in which the present invention can operate. The environment is a computer system 2700 that includes one or more processors, such as processor 2704. The processor 2704 is connected to a communications bus 2706. Various software embodiments are described in terms of this example computer system. After reading this description, it will be apparent to a person skilled in the relevant art how to implement the invention using other computer systems and/or computer architectures.

Computer system 2700 includes a graphics subsystem 2703. Graphics subsystem 2703 can be implemented as one or more processor chips. The graphics subsystem 2703 can be included as part of processor 2704 as shown in FIG. 24 or as a separate graphics engine or processor. Graphics data is output from the graphics subsystem 2703 to the bus 2706. Display interface 2705 forwards graphics data from the bus 2706 for display on the display unit 2706. This graphics data includes graphics data for the screen displays described herein Computer system 2700 also includes a main memory 2708, preferably random access memory (RAM), and can also include a secondary memory 2710. The secondary memory 2710 can include, for example, a hard disk drive 2712 and/or a removable storage drive 2714, representing a floppy disk drive, a magnetic tape drive, an optical disk drive, etc. The removable storage drive 2714 reads from and/or writes to a removable storage unit 2718 in a well known manner. Removable storage unit 2718 represents a floppy disk, magnetic tape, optical disk, etc., which is read by and written to by removable storage drive 2714. As will be appreciated, the removable storage unit 2718 includes a computer usable storage medium having stored therein computer software and/or data.

In alternative embodiments, secondary memory 2710 may include other similar means for allowing computer programs or other instructions to be loaded into computer system 2700. Such means can include, for example, a removable storage unit 2722 and an interface 2720. Examples can include a program cartridge and cartridge interface (such as that found in video game devices), a removable memory chip (such as an EPROM, or PROM) and associated socket, and other removable storage units 2722 and interfaces 2720 which allow software and data to be transferred from the removable storage unit 2722 to computer system 2700.

Computer system 2700 can also include a communications interface 2724. Communications interface 2724 allows software and data to be transferred between computer system 2700 and external devices via communications path 2726. Examples of communications interface 2724 can include a modem, a network interface (such as an Ethernet card), a communications port, etc. Software and data transferred via communications interface 2724 are in the form of signals which can be electronic, electromagnetic, optical or other signals capable of being received by communications interface 2724, via communications path 2726. Note that communications interface 2724 provides a means by which computer system 2700 can interface to a network such as the Internet.

Graphical user interface module 2730 transfers user inputs from peripheral devices 2732 to bus 2706. These peripheral devices 2732 can be a mouse, keyboard, touch screen, microphone, joystick, stylus, light pen, or any other type of peripheral unit. These peripheral devices 2732 enable a user to operate and control the data visualization tool of the present invention as described herein.

The present invention is described in terms of this example environment Description in these terms is provided for convenience only. It is not intended that the invention be limited to application in this example environment In fact, after reading the following description, it will become apparent to a person skilled in the relevant art how to implement the invention in alternative environments.

The present invention is preferably implemented using software running (that is, executing) in an environment similar to that described above with respect to FIG. 24. In this document, the term "computer program product" is used to generally refer to removable storage device 2718 or a hard disk installed in hard disk drive 2712. These computer program products are means for providing software to computer system 2700.

Computer programs (also called computer control logic) are stored in main memory and/or secondary memory 2710. Computer programs can also be received via communications interface 2724. Such computer programs, when executed, enable the computer system 2700 to perform the features of the present invention as discussed herein. In particular, the computer programs, when executed, enable the processor 2704 to perform the features of the present invention. Accordingly, such computer programs represent controllers of the computer system 2700.

In an embodiment where the invention is implemented using software, the software may be stored in a computer program product and loaded into computer system 2700 using removable storage drive 2714, hard drive 2712, or communications interface 2724. Alternatively, the computer program product may be downloaded to computer system 2700 over communications path 2726. The control logic (software), when executed by the processor 2704, causes the processor 2704 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

11. Hierarchy Data Visualization Tool a. Example Hierarchy Data Visualization Tool FIG. 28 shows a screen display 2800 of an example data visualization tool according to the present invention. Screen display 2800 includes a main display window 2805. A hierarchy or tree data visualization 2810 is displayed within the main display window 2805.

Preferably, the hierarchy 2810 is generated from a data file based on a configuration file. The data and configuration files can be generated using a tool manager or input directly by the user. The configuration file describes the format of input data and how the data is to be graphically displayed to form hierarchy 2810. The data file represents data extracted from a data source, such as, a relational or non-relational database, and formatted for use by the data visualization tool. The generation and operation of data and configuration files is described further with respect to FIGS. 38 and 39.

External controls surround the main display window 2805. These external controls consist of an array of viewer buttons 2820–2825, a set of thumb wheels 2830–2833, and a height slider 2834. Home button 2820 moves the viewpoint, that is the camera viewpoint, of the main display window to a designated home location. The home location can be an initial location set automatically at start-up or a viewpoint stored during operation of the data visualization tool when a user clicks the Set Home button 2821.

View All button 2822 permits a user to view the entire hierarchy 2810 while keeping a constant tilt and angle of view present at the time the View All button 2822 is pressed. For example, to gain an overhead view of hierarchy 2810, the field of view (also called a camera view) is rotated to look down on entities in the data visualization 2810. Clicking the View All button 2822 then moves a viewpoint providing an overhead view of hierarchy 2810.

Go Back button 2823 returns the camera viewpoint to an immediately preceding location. Go Forward button 2824 returns the camera viewpoint to the location at which a Go Back button 2823 was previously pressed. Move Up button 2825 is actively only when a object in the data visualization 2800 is selected. The operation of the Move Up button 2825 depends upon what object or object graphical attribute is selected. If a bar in an object is selected, clicking the Move Up button 2825 selects the base containing the bar. If an object base is selected, clicking the Move Up button 2825 moves up the hierarchy to the parent node.

The four thumbwheels allow a user to dynamically move the camera viewpoint. Vertical height (H) thumbwheel 2830 moves the camera up and down. The camera viewpoint cannot move below ground level. Vertical tilt thumbwheel 2831 tilts the direction the camera faces. The tilt varies between a range from straight ahead to straight down. Horizontal pan (<-->) thumbwheel 2832 moves the camera viewpoint from left to right (and right to left). The vertical Dolly thumbwheel 2833 moves the viewpoint forward and backward from the user. This movement magnifies and reduces the data visualization 2810, thereby, providing more or less detail in the display.

Height slider 2834 controls scaling of objects displayed in the data visualization 2810. For example, pushing the slider 2834 to a value of 2.0 doubles the size of all objects in the window. Pushing the slider 2834 to 1.0 returns objects to original heights.

Mouse controls (not shown) allow further interaction with a display view. Clicking on an object (e.g. node) selects and zooms to an object. A spotlight shines down and information about the object is displayed automatically. During zooming, the zoom algorithm described above is used. Shift-licking a mouse button selects an object without zooming.

Clicking another mouse button (e.g. a middle mouse button) allows free-form navigation as described above. Click-and-hold the mouse button moves a camera viewpoint in a free-form path. Move the mouse up while clicking and holding the mouse button, moves the camera viewpoint forward (towards the bottom of the hierarchy, that is, in a positive z coordinate direction). Moving the mouse back, left, and right, likewise, moves the camera viewpoint backwards, left, and right respectively. If the shift button is held down while pressing the middle mouse button, the viewpoint moves up and down (along y coordinate dimension).

b. Control Bar Menus

A control bar 2840 has file pull-down menus (File, Show, Display, Go, and Help) that access the data visualization tool functions. The five pull-down menus and their commands (including some corresponding keyboard short cuts) are shown in FIGS. 29 to 33 respectively.

Figure 29:
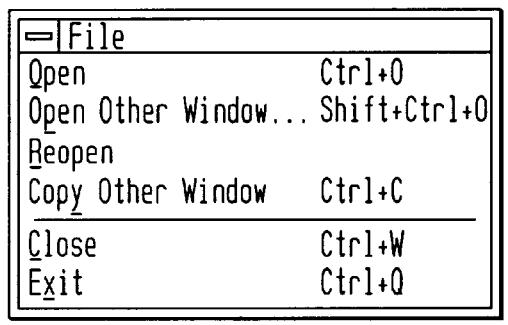
FIGS. 29, 30, 31, 32, and 33 illustrate respective pull-down control menus used in the tree data visualization tool shown in FIG. 28.

As shown in FIG. 29, the File menu has six commands (Open, Open Other Window, Reopen, Copy other Window, Close, and Exit). Open command loads and opens a configuration file, displaying it in the main window 2805. Previously displayed data is discarded. Open command is used to view a new data set, or to view the same data set after changing its configuration. Open Other Window command opens a configuration file, but displays its results in a different window. The current data set remains open. Reopen command reopens the currently open file. This can be used after the configuration or data file has been updated. Copy Other Window command opens a new window that displays the same view of the current data set. A user can interact with more than one open window independently. Close command closes a current window and all panels associated with it. Exit command option closes all windows and exists the data visualization tool application.

Figure 30:
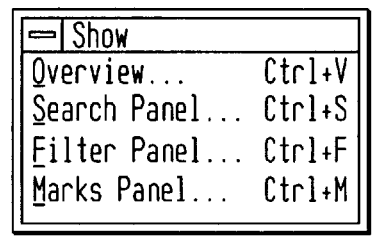

As shown in FIG. 30, the Show menu has four command options (Overview, Search Panel, Filter panel, and Marks Panel). Each of the Show menu command options brings up another dialog box or panel for interacting with the data. Overview command brings up a new window with an overview of the complete hierarchy as shown in FIG. 25 described above. Search Panel command brings up a search panel that enables a user to specify criteria to search for objects in the data visualization 2810. Filter Panel command brings up a filter panel that lets a user filter selected information to fine-tune the displayed hierarchy in data visualization 2810. The filter panel lets a user emphasize specific information or shrink the amount of data for better run-time performance and user comprehension. Selecting Marks Panel command brings up a marks panel that lets a user name and store important locations in a hierarchy data visualization 2810. Examples of a search panel, filter panel, and marks panel are described further with reference to FIGS. 34 to 36.

Figure 31:
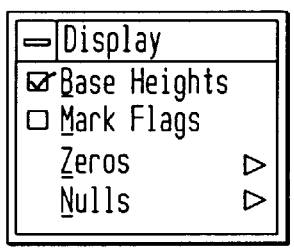

As shown in FIG. 31, the Display menu has four command options (Base Heights, Mark Flags, Zeros, Nulls). Base Heights command is a toggle option that lets a user turn the heights of the bases in hierarchy data visualization 2810 on and off. Turning the Base Heights toggle option on provides summary information about all the bars for a base object. Toggling the Base Heights option off enables a user to see negative numbers or compare bar heights for an object more easily. The initial value of this base heights toggle can be changed with a "base height" statement in the configuration file.

Marks Flags command is a toggle option that lets a user turn off or on flags representing marks in a hierarchy data visualization 2810. Zeros command lets a user control the display of zero data as graphical attributes in hierarchy data visualization 2810. When the Zero command is selected, a drop-down menu appears which includes three additional commands for controlling the display of zero values as solid objects, outlined objects, or hidden objects. Nulls command lets a user control the display of null values.

Figure 32:
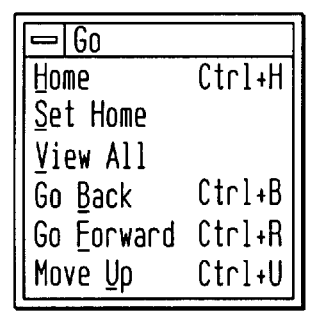

As shown in FIG. 32, the Go menu has six command options (Home, Set Home, View All, Go Back, Go Forward, and Move Up) that duplicate the functions of the buttons 1820–1825, described above. Accordingly, the functions of Go Menu command options do not need to be described in detail.

Figure 33:
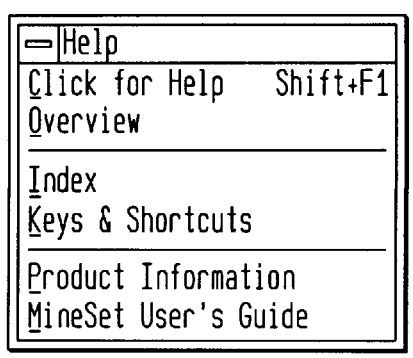

As shown in FIG. 33, the Help menu has five command options (Click for Help, Overview, Index, Keys & Shortcuts, Product Information, and Mineset User's Guide). Click For Help command turns a cursor into a question mark. Placing the cursor over an object in the main display window 2800 and clicking a mouse causes a help screen to appear. This help screen contains information about the selected object. Closing the help window restores the cursor to its arrow form and deselects the help function.

Overview command provides a brief summary of the major functions of the data visualization tool, including how to open a file and how to interact with the resulting display view. Index command provides an index of the complete help system. Keys and Shortcuts command provides keyboard shortcuts for all of the data visualization tools functions that have accelerator keys. Product Information command brings up a screen with the version number and copyright notice for the data visualization tool currently being executed. User's Guide allows a user to browse a user guide for the product.

c. Search Panel

Figure 34:
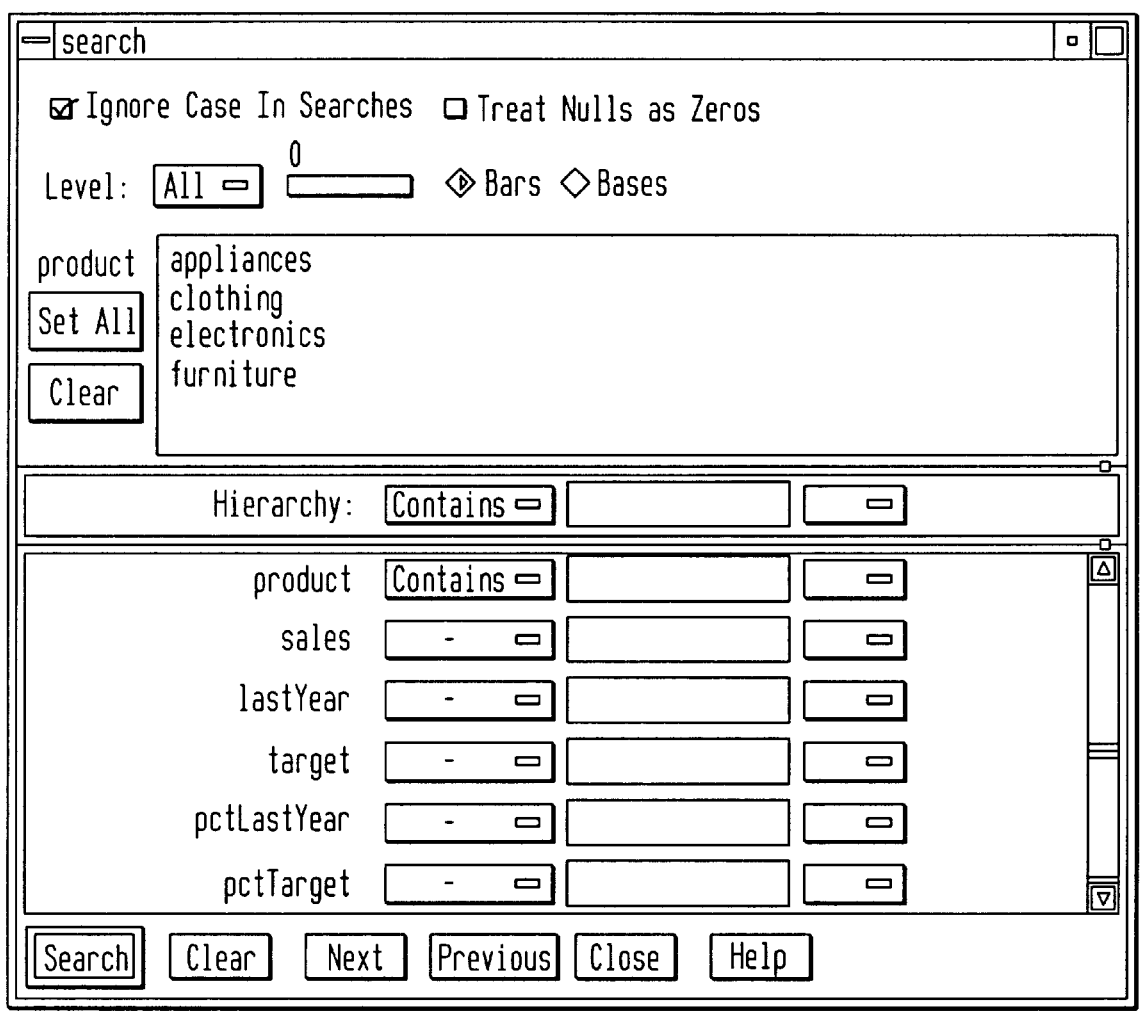
FIG. 34 shows a search panel for searching a hierarchy data visualization according to the present invention.

FIG. 34 shows an example search panel that opens when the Search command is selected in the Show menu. The search panel lets a user specify criteria to search for objects. Once the search is complete, yellow spotlights highlight objects matching the search criteria. Marks (e.g. flags) can also be set automatically to highlight objects matching the search criteria.

To specify whether a search is case-sensitive, a user clicks the Ignore Case In Searches toggle button, at the top of the Search panel. For example, if this toggle is on (a check mark appears on that button), the string "hello" is the same as "HellO". To the right of the case sensitivity toggle is a toggle labeled Treat Nulls as Zeros. If this toggle is off (the default), comparisons involving nulls can not return TRUE in a search. If the toggle is on, nulls are treated as equal to zero.

Below the case-sensitivity toggle are controls that let a user specify the parts of the hierarchy to be searched. By default, the whole hierarchy is searched. To search a single level of the hierarchy, turn off the All button (next to the Level: label), and choose the level to be searched with the slider. Level 0 is the root of the hierarchy, Level 1 is the level below that, and so forth.

Toggle buttons also let a user choose whether to search the bars or the bases. When searching through bars, the default is that all bars are searched. To search only a specific list of bars, a user must select them. The Set All button turns on all bars; this is useful if most of the bars are to be searched, and only a few are to be turned off. The Clear button turns off all bars. If no bar is selected, the bar list is ignored, and all bars are searched.

Below the panel for bar labels is a Hierarchy field that lets a user specify nodes to search. Below the Hierarchy field are fields that lets a user specify search criteria for individual columns. To search for numeric values, a user enters the value, and selects a relational operation (=, !=, >, <, >=, <=). To search for alphanumeric values, the string to be searched for is entered. For example, a user can use any of three types of string comparisons:

Contains indicates that it contains the appropriate string.
   For example, California contains the strings Cal and forn.
Equals requires the strings to match exactly.
Matches allows wildcards:
   An asterisk (*) represents any number of characters.
   A question mark (?) represents one character.
   Square braces ([ ]) enclose a list of characters to match
For example, California matches Cal*, Cal?fornia, and Cal[a-z]fornia.

In some cases (usually associated with binning in a Tool Manager), an option menu of values appears, instead of a text field. To ignore that variable, select Ignored in the Option menu. Relational operators (such as>=) can be used with these options. This means that the specified value as well as subsequent ones are selected.

In addition to numeric and string comparison operations, a user can specify is Null, which will be true if the value is null.

To the right of each search field is an additional option menu that lets a user specify "And" or "Or" options. For example, a user could specify "sales >20 And <40". Any number of And or Or clauses for a given column can be used, but cannot And and Or cannot be mixed for a-single column.

Note that if different levels of the hierarchy are keyed by different types of data (for example: the top level is selected by strings, while the second level is selected by integers), then the "Hierarchy" search field is treated as a string and provides string operations, not number operations.

If the Ignore Case In Searches toggle is on, the comparisons of all string searches are case-insensitive.

Six buttons are placed across the bottom of the Search panel:

Search causes the search to be started. This button is automatically activated if the Enter key is pressed and the panel is active.

Clear turns off all search spotlights and erases the values from the search fields.

Next selects and zooms to the next matched object, in left-to-right order. After the last matched object is selected, clicking on Next returns the view to the Home position. Next is only valid after a search that has found matches.

Previous selects and zooms in the opposite order from that of the Next button.

Close closes the search window and turns off the search spotlights. If the Search panel is reopened, it is in the same state as it was before the last Close; clicking Search again repeats the last search.

d. Filter Panel

Figure 35:
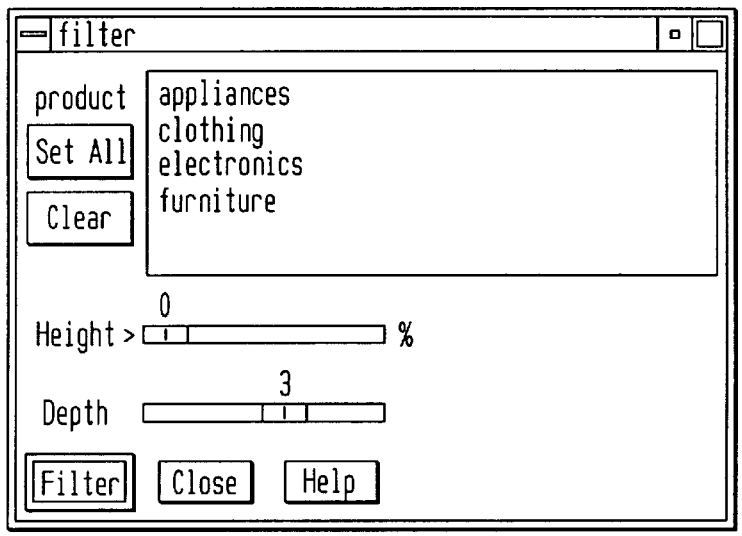
FIG. 35 shows a filter panel for filtering a hierarchy data visualization according to the present invention.

As shown in FIG. 35, a filter panel lets a user input filter criteria to reduce the number of objects displayed in a hierarchy or tree data visualization. The Filter panel filters out selected information, thus fine-tuning the displayed hierarchy. A Filter panel can be used to emphasize specific information, or to shrink the amount of data for better performance.

The buttons at the top left of the panel filter the information to be displayed based on specific bars. Select the bars to be filtered by clicking on them. The Set All button turns on all bars; this is useful if most of the bars are to be searched, and only a few are to be turned off. The Clear button turns off all bars. If no bar is selected, the bar list is ignored, and nothing is filtered. Filtering bars does not affect the information in the base, which continues to include the summary of all bars.

Below the bar label window of the Filter panel is the Height filter slider. This slider lets a user filter out those graphics that contain only small values. The size of a value is shown as a percentage of the maximum height. Only those nodes that contain at least one bar above the specified value, or which contain descendants in the hierarchy that exceed the specified value, are kept. As long as at least one bar meets this criterion, the complete node is maintained. Although small nodes are filtered out, their values are cumulated up the hierarchy. A user can also set this filtering option in the configuration file by using the Height Filter command:

Click on the Filter button to start filtering. If the Enter key is pressed while the panel is active, filtering automatically starts.

Click on the Close button to save the filtering results and close the panel.

The depth slider, which is under the Height Filter slider, provides a depth input, such as depth input 215 described above. The depth slider lets a user filter the complete hierarchy to display partial hierarchies having a specified depth (e.g. a number of levels) set by the depth slider.

e. Marks Panel

Figure 36A:
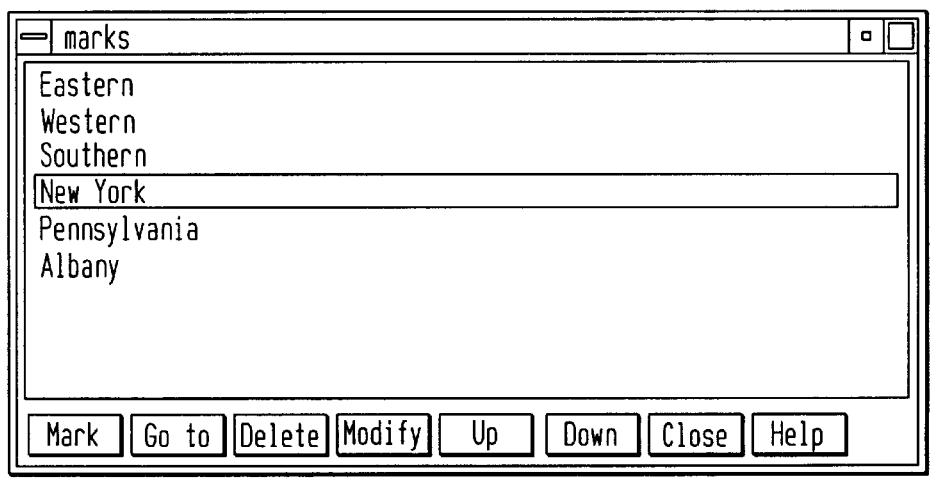
FIGS. 36A to 36C illustrate marking a hierarchy data visualization according to the present invention.
Figure 36B:
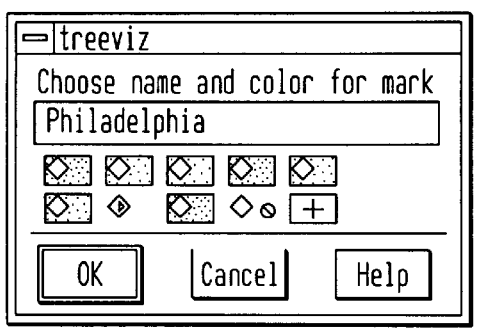
Figure 36C:
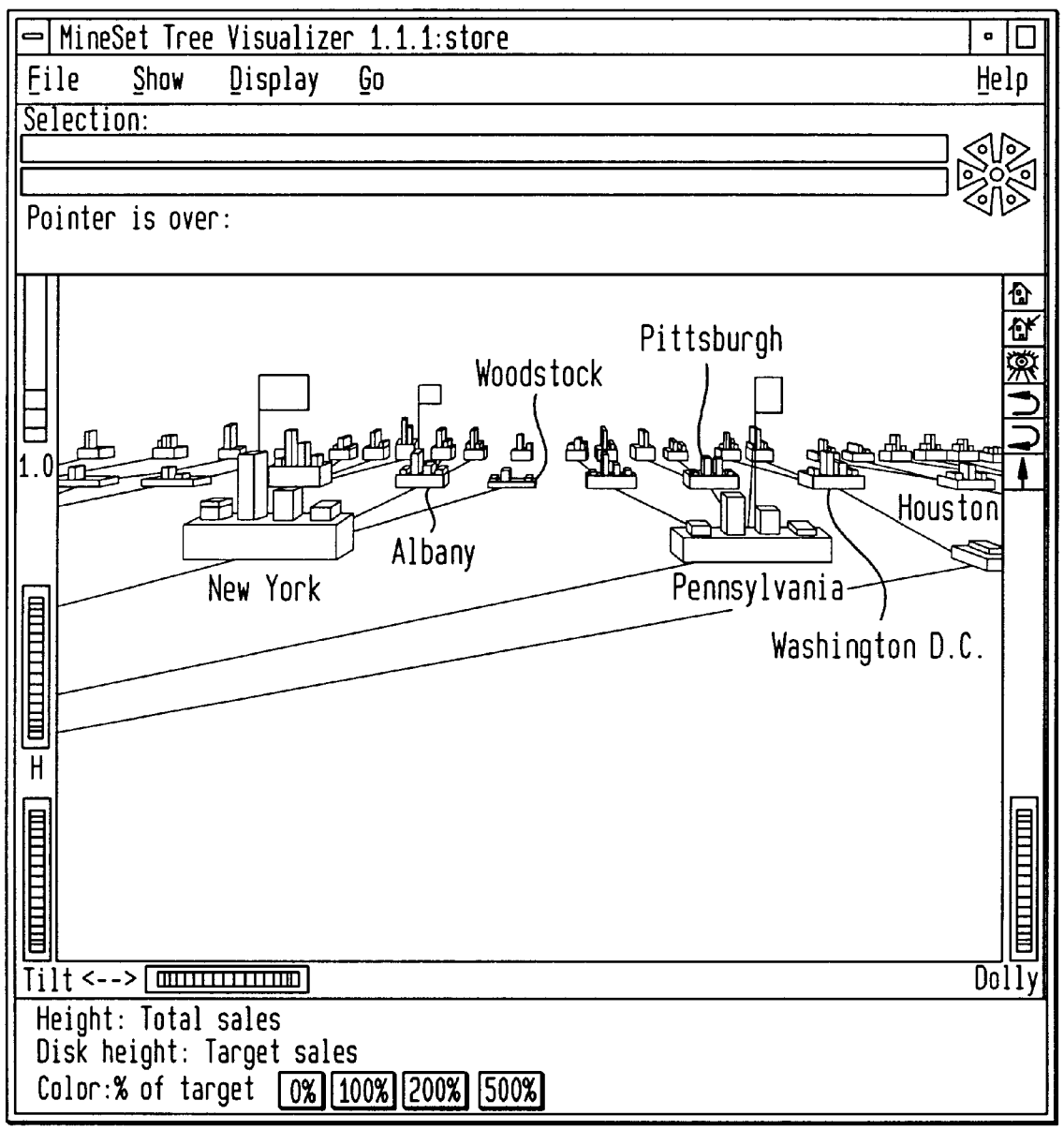

FIGS. 36A to 36C show the operation of marks in a tree data visualization tool according to the present invention. As shown in FIG. 36A, a Marks panel 3600 lets a user name and store important locations (viewpoints) so that a user can easily and quickly select and return to them. The location is stored relative to the currently selected object. If no object is selected, the absolute location is recorded. For new marks, a Marks Define panel can be used to define a mark name and color (FIG. 36B).

As shown in an example partial hierarchy display view in FIG. 36C, all marks can be indicated by colored flags in the main view. If the mark represents a selected object, the flag is placed on that object. If it represents an absolute position, the flag is placed at that position. To go to the mark, a user can click on the flag. All flags can be turned on and off using the Mark Flags menu entry in the Display menu.

Click on the Mark button to mark the current location. Another dialog box appears (FIG. 36B) to prompt for the name and color of the mark. The default name is that of the currently selected object. The color controls the color of the flag appearing in the main window and which represents the mark. If a user does not want a flag to represent the mark, click on the button with the "Not" symbol (slash through a circle). To add another color to the palette, click on the button with the plus symbol (+) to bring up a color chooser.

FIG. 36C shows a sample main window displaying a partial hierarchy with flags representing the created marks.

The bottom Mark control bar in FIG. 36A operates as follows:

Click the Go to button to bring up the current location associated with the selected mark in the panel. Double-clicking on a mark has the same effect. If the object selected by that mark no longer exists (because it was filtered out, or the data was changed since the mark was created), the location shown is close to where the object would have been.

Click the Delete button to delete the selected mark in the panel.

Click the Modify button to change the name or color of the selected mark in the panel.

Click the Up button to move the selected mark in the panel up in the listing order.

Click the Down button to move the selected mark in the panel down in the listing order.

Click the Close button to exit the marks panel.

f. Configuration Options

FIG. 37 shows an Options dialog box that permits a user to change a number of tree data visualization tool configuration options. In this example, the top of the dialog box has three columns: Bars, Node Bases, and Disks. The columns allow the following configuration options to be applied to Bar, Node Bases, or Disks independently:

Normalize Heights Option lets a user normalize heights across each level of the hierarchy (or across all levels) of bars, node bases, and disks. Normalizing the heights determines the maximum value of the height variable; it normalizes all values relative to that height. Thus, if the maximum value is 30.0, and the maximum bar height was set to 1.0 (in arbitrary units), a value of 15.0 would be mapped to a value of 0.5.

Normalizing across each level will independently normalize each level of the hierarchy. This option is most useful if data has been summed up the hierarchy, and prevents the top level of the hierarchy from dwarfing items at the lowest level. Normalizing across all levels normalizes everything together, regardless of the level in the hierarchy. If neither box is checked for bars, no normalization takes place.

Node Bases are normalized independently of Bars. If no boxes are checked under the Node Bar column, the same normalization method is used for bars, although the values are normalized independently.

If disks are present and no boxes are checked under the Disks column, then disks are normalized in conjunction with the bars: a disk and a bar representing the same value have the same height. If a normalized box is checked for Disks, disks are normalized independently of the bars: the highest disk and the tallest bar have the same height, regardless of the actual values represented by them.

Max/Scale Heights Option lets a user specify the height of the tallest bars and node bases. The default is 1.0 (in arbitrary units). If after looking at the view, a user sees that the heights are too low or too high, this field is used to adjust them. For example, entering 2 in the field causes all bars to be doubled in height; entering 0.5 makes all bars half as big.

If normalization was specified, this value represents the height of the tallest bar or base. If normalization was not specified, all values are scaled by this amount. The latter can be useful when comparing views of two different data sets.

Filter Out % Shortest Option lets a user filter out the shortest values. For example, if a user enters 5% in this field, then only those nodes containing bars that are at least 5% of the height of the tallest bar are shown. This option is useful in speeding up the rendering of slow, complex scenes, or for reducing clutter resulting from many bars near zero height.

Height Aggregation Option controls the aggregation or cumulation of data, if any, between parent and child nodes. By default, the height of the bars of the parent node are the sum of the height of all the bars of the children. These heights can represent different types of aggregation information, such as, average, maximum, minimum, count, or any. This aggregation can be used for the values of the bar heights, base heights, and disk heights.

The Colors portion of the window includes a set of options for controlling color. This set of options lets a user:

specify the list of colors to use (Color List to Use Option)

specify the kind of mapping (Kind of Mapping Option)

map colors to bars, node bases, and disks (Color Mapping Option)

represent different aggregations of data as color (Color Aggregation)

To use these Colors options, a user must have mapped a column of data to the *Color—Bar, *Color—Disk and/or *Color—Base Requirements of the Destination panel as described above.

Color list to use Option lets a user select colors for bars, node bases, and disks. Color swatches and other color tools can be used to facilitate color selection. Pressing the + button brings up a color chooser to add a new color.

Clicking on a color swatch brings up the color chooser to allow color to be changed and/or selected. Clicking the— button deletes a color. Clicking the left or right buttons allow reordering of the colors. A user can enter as many colors into this field (as necessary for a display) while maintaining an equal number of values in the Color mapping field.

Kind of mapping Option lets a user specify whether the color change that is shown in the graphic display is Continuous or Discrete. If Continuous is chosen, then the color values (of the bars, node bases, or disks) shift gradually between the colors entered in the Color list to Use field as a function of the values that are mapped to those colors in the Color Mapping field. If Discrete is chosen, then the colors change only at specified boundaries.

Color mapping Options lets a user specify a data value to which the colors are mapped. If Continuous color mapping is chosen, the color values shift gradually between the colors entered in the Color List to Use field as a function of the data values that are mapped to those colors. When Discrete color mapping is selected, the colors change in discrete intervals.

Color Aggregation Option controls what type of aggregation of data is represented by a color value. By default, the values of the color of the bars of the parent node are the sum of the values of all the bars of the children; however, these colors can be average, max, min. or any. This aggregation can be used for the values of the bar colors, base node colors, and disk colors.

Color by Key Option lets a user have the bars automatically colored by their key value. To do this, do not specify a mapping to Bar Color. If a user specifies no color list, then colors for the bars are chosen at random. If a color list is specified, then a user must specify as many colors as there are key values.

Other configurations options also are provided in the Options window shown in FIG. 37. Make Fixed Option places all bars across one row by default. This option allows changing the number of rows or columns. If neither rows nor columns is selected, or the number is set to 0, then neither rows nor columns is fixed, and the closest approximation to a square is displayed.

Message Option lets a user type in a message statement. The message statement specifies the message displayed when the pointer is moved over an object or when an object is selected. By default, the same message is used for the base as for the bars. If no message is specified, a default message containing the names and values of all the columns is used. Preferably, the format of the message matches the type of data being used.

Sky Color Option lets a user specify either one or more colors. If only one color is specified, the sky is solid. If two or more colors are specified, the sky is shaded between the colors. For example, when specifying two colors, the first color is for the top of the sky, the second for the bottom.

Ground Color Option lets a user specify either one or more colors. If only one color is specified, the ground is solid. If two colors are specified, the ground is shaded between the colors. For the ground, the first color is for the far horizon, the second is for the near ground.

Sort Order Option has a Sort by Key toggle for determining whether the nodes in the display are shown in a sorted order. A menu next to the toggle lets a user specify whether to sort in ascending or descending order.

An OK button permits a user to save selected changes to default parameters and exit the Configuration Options window. Reset Options button permits a user to reset changes in parameters in the Configuration Options window to initial default parameters. Cancel button permits a user to exit without saving any changes to default parameters.

12. Example Tool Manager and Network

Figure 38:
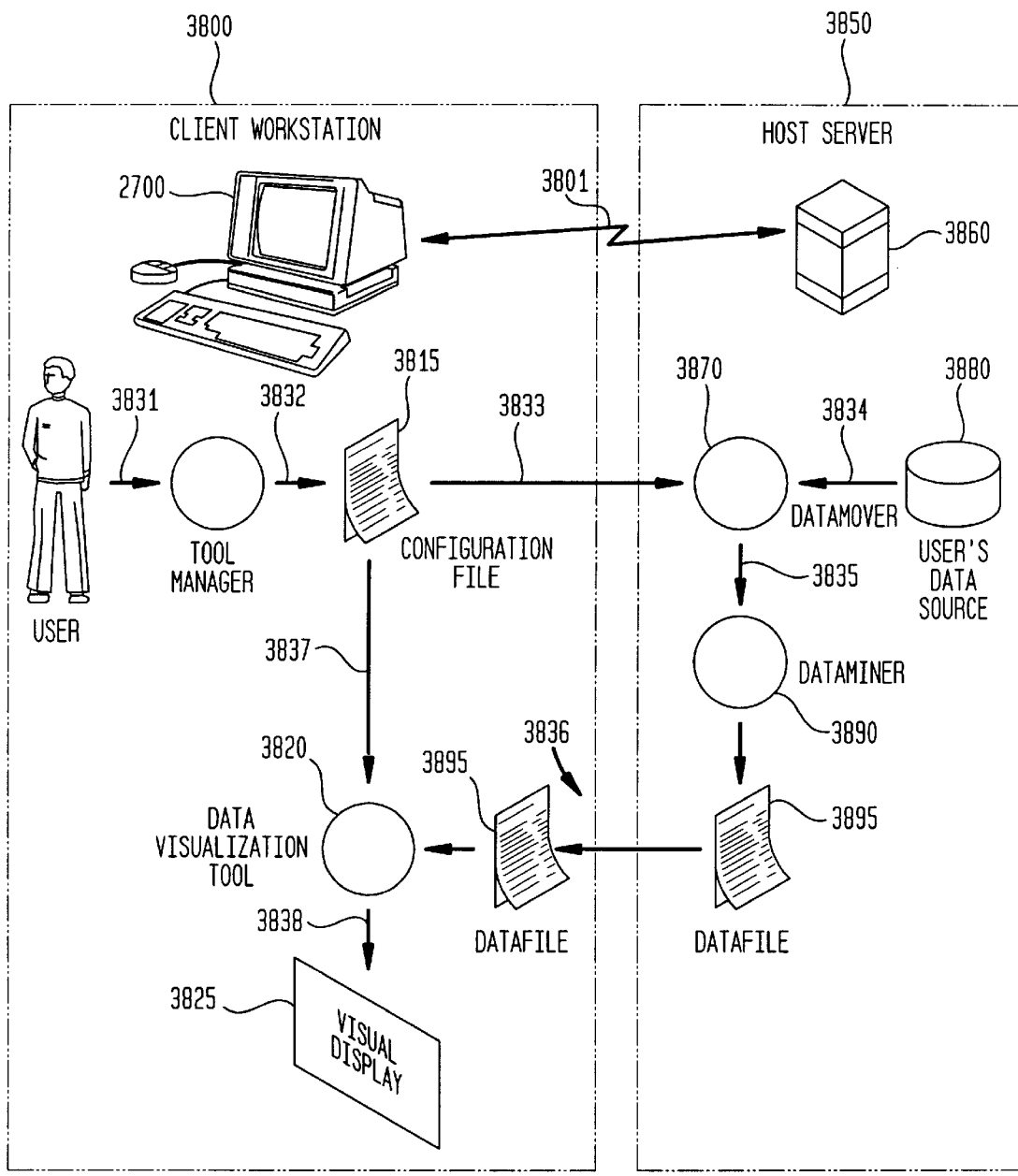
FIG. 38 shows an example client/server network implementing the data visualization tool shown in FIG. 28.

FIG. 38 illustrates an overall client/server network environment in which a data visualization tool according to the present invention operates. A client workstation 3800 communicates over a data link 3801 with a host server 3850 as part of a local area network (LAN), campus-wide network, wide-area-network (WAN), or other network type configuration. Any data communication protocol can be used to transport data.

The client workstation 3800 includes a computer system 2700 as described above with respect to FIG. 27. The computer system 2700 runs a tool manager 3810 for managing operation of a data visualization tool 3820 output on visual display 3825. Preferably, tool manager 3810 and data visualization tool 3820 are software algorithms executed on computer system 2700. The host system 3850 includes a host processor 3860 and a data source 3880. Data mover 3870 and data miner 3890 are included at the host server 3850, and preferably, are implemented in software executed by the host processor 3860.

FIG. 38 further illustrates the flow of a data visualization tool execution sequence through steps 3831–3837. First, a user logs onto the client workstation 3800 and opens tool manager 3810 (step 3831). Though the tool manager 3810, the user can select and configure a scatter data visualization tool as described above. A configuration file 3815 must be set which identifies the content to be displayed in a data visualization and appropriate external dimension ranges. To facilitate this process, predefined preference panels, templates and/or data palettes can be accessed through menu-driven commands and pop-up display windows to permit the user to easily define the content of a data visualization and appropriate external dimension ranges.

Figure 39:
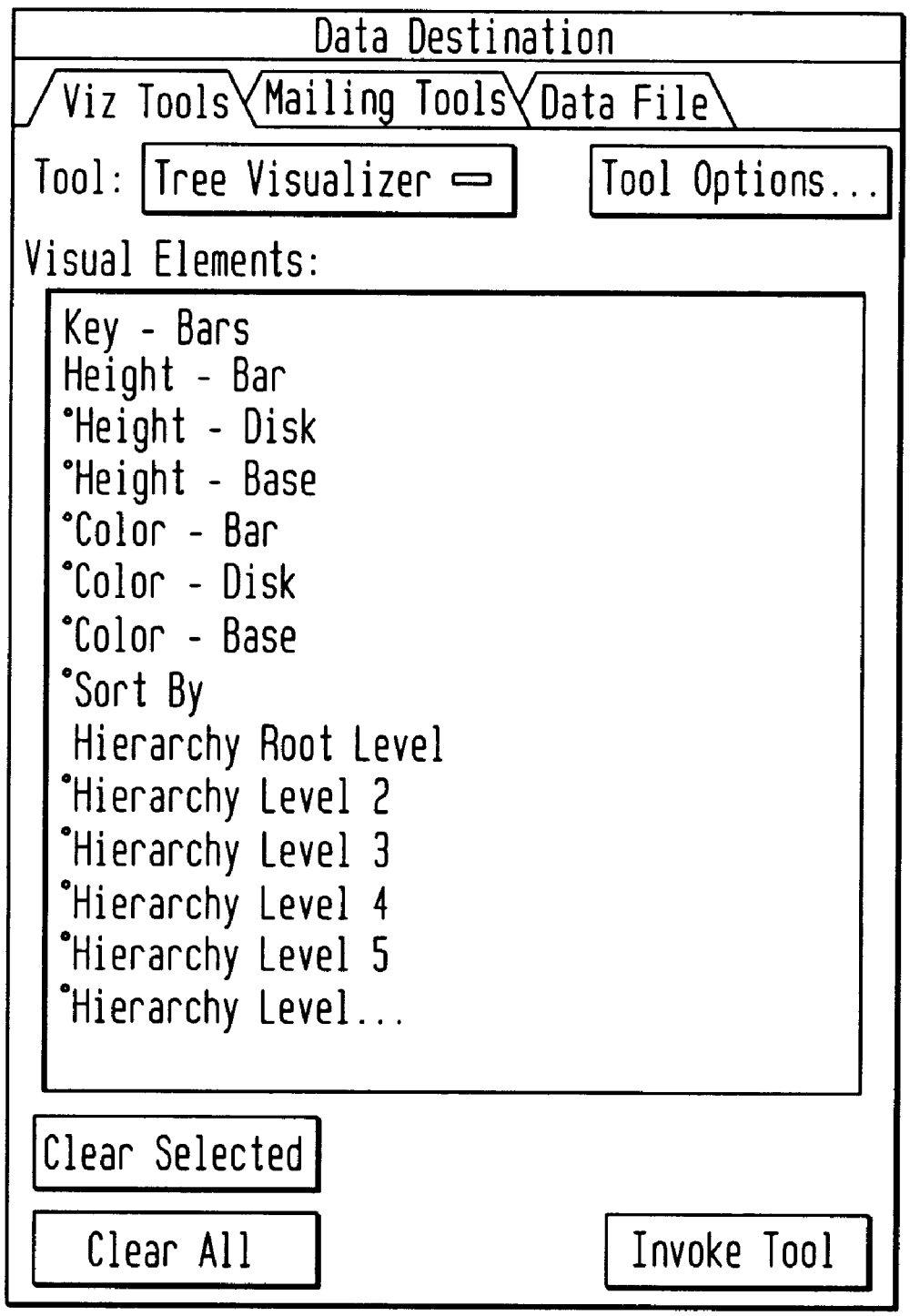
FIG. 39 shows a panel for constructing a configuration file for a hierarchy is data visualization according to the present invention The present invention is described with reference to the accompanying drawings. In the drawings, like reference numbers indicate identical or functionally similar elements. Additionally, the left-most digit(s) of a reference number identifies the drawing in which the reference number first appears.

FIG. 39 shows a data destination panel that permits a user to construct a configuration file 3815 by defiling mapping requirements for data. Tool option button opens the tree configuration options window, as described above with respect to FIG. 37, to permit a user to change parameters for the tree data visualization tool from default values. Tool manager 3810 then generates a configuration file 3815 defining the content of the data visualization and scope of external dimension space (step 3832).

The configuration file is sent over data link 3801 to the host server 3850 (step 3833). A copy of the configuration file 3815 is also stored at the client workstation 3820 for use by the data visualization tool 3825 (step 3837). At the host server 3850, the data mover 3870 extracts data from the data source 3880 corresponding to the configuration file 3815 (step 3834). The data miner 3890 receives extracted data from the data mover 3870 and generates a data file 3895 (step 3835). Data miner 3890 then sends the data file 3895 to the client workstation 3800 (step 3836).

Finally, in step 3838, the tree data visualization tool 3820 uses the data file 3895 to generate a hierarchy or tree data visualization in a display window as described herein.

As shown in FIG. 39, a data destination panel is used to simplify the task of constructing a configuration file 3815 for a tree data visualization tool. Visual elements are listed in a panel. Data attributes represented by the hierarchy are mapped to these visual elements. These visual elements or items define the data attributes (or combinations of data attributes) which are mapped to graphical objects (bars, bases, and disks) and their graphical attributes (height, color). The visual elements further define the layout of the hierarchy (root level, levels 2 to 5, and sort criteria). Optional items are preceded by an asterisk.

The example visual elements function as follows:

Key bars—Lets a user define what the bars shown in a main display window of a tree data visualization tool represent For example, when data is presented in a table representing the budget of the 50 United States, the keys could be state names. If the first key is associated with Alabama, the first bar represents the values for Alabama.

Height Bar—Lets a user specify what the bar heights represent. Typically, the higher the bar, the greater the value represented.

Sort By—Lets a user specify a column of values used to sort the layout of the nodes. The sort order defaults to ascending from left to right.

Hierarchy Root Level—Lets a user specify how the table from a data source is converted into a hierarchy. The requirements list defaults to six hierarchical levels. If a user specifies a sixth hierarchy level, the tree data visualization tool automatically adds a seventh. With every next level a user specifies, the tree data visualization tool adds another one. A user can specie as many hierarchy levels as necessary.

Height-Disk—Lets a user specify what the heights represent for optional disk placed at the same location as the bar. If no mapping is specified, no disks are displayed.

Height-Base—Lets a user specify what the base heights represent. If no mapping is specified, the bar height mapping is used.

Color-Bar—Lets a user specify what the bar colors represent. The specific colors mu be assigned via the Tool Manager's Tool Options panel.

Color-Disk—Lets a user specify what the disk colors represent. This option has an effect only if the disk height is specified.

Color-Base—Lets a user specify what the base colors represent. If no mapping is specified, the bar color mapping is used.

Control buttons are also included in the data destination panel. Tree Visualizer button lets a user exit the panel to return to the tree data visualization tool. Tool Options button displays the Options dialog box described above with respect to FIG. 37. Clear Selected button clears a selected mapping requirement. Clear All button clears all mapping requirements. Invoke Tool button can be pressed after a configuration file is saved to see the tree data visualization corresponding to the saved configuration file.

While the data destination panel reduces the work in creating a configuration file, a configuration file 3815 can be constructed manually using a text editor.

As mentioned above, the present invention can be used in any data mining and graphics data visualization tool, including, but not limited to, the MineSet product manufactured by SGI, the tree data visualization tool described above, and the file system navigator described in U.S. Pat. Nos. 5,528,735 and 5,555,354 (each incorporated herein by reference).

13. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-implemented method for navigating through partial hierarchies, the method comprising the steps of:
   determining a new effective camera position (x,z) within a current partial hierarchy based on a new navigator position;
   fetching a new partial hierarchy corresponding to said new effective camera position;
   determining an orientation between said new effective camera position and at least one reference object in said current partial hierarchy;
   adjusting said new effective camera position to maintain said orientation with the said at least one reference object as found in said new partial hierarchy fetched in said fetching step;
   converting said adjusted new effective camera position to a new camera position; and
   displaying a display view showing said fetched partial hierarchy layout in a field of view of a camera positioned at said new camera position;
   wherein said orientation determining step determines an orientation between said new effective camera position and two reference objects in the current partial hierarchy;
   wherein said orientation determining step comprises the steps of:
      finding two reference nodes in the current partial hierarchy, determining a point in front of said new effective camera position on a line intersecting said two reference nodes, and
      calculating a proportion of the distance between said determined point and one of said two reference nodes; and
   wherein said adjusting step adjusts an x coordinate of said new effective camera position to maintain said proportion with said one reference node as found in said new partial hierarchy fetched in said fetching step;
   whereby, a user viewing said current partial hierarchy at said current camera position can navigate in a substantially straight line to a new navigator position.

2. The method of claim 1, wherein said fetching step fetches said new partial hierarchy from a cache of partial hierarchies or fetches said new partial hierarchy from an interpolator.

3. The method of claim 1, wherein said fetching step generates said new partial hierarchy on the fly.

4. The method of claim 1, further comprising the step of:
   permitting a user to mark at least one of a selected object or a selected location in said displayed partial hierarchy.

5. The method of claim 4, further comprising the step of:
   storing relative coordinates for a mark that identifies a location of said mark relative to coordinates for the selected object.

6. A computer-implemented method for navigating through partial hierarchies, the method comprising the steps of:
   determining a new effective camera position (x,z) within a current partial hierarchy based on a new navigator position;
   fetching a new partial hierarchy corresponding to said new effective camera position;
   determining an orientation between said new effective camera position and at least one reference object in said current partial hierarchy;
   adjusting said new effective camera position to maintain said orientation with the said at least one reference object as found in said new partial hierarchy fetched in said fetching step;
   converting said adjusted new effective camera position to a new camera position; and
   displaying a display view showing said fetched partial hierarchy layout in a field of view of a camera positioned at said new camera position;

wherein said orientation determining step determines an orientation between said new effective camera position and one reference object in the current partial hierarchy; and wherein said orientation determining step comprises the steps of:
  finding one reference node in the current partial hierarchy,
  determining a displacement distance between said new effective camera position and said one reference node in said current partial hierarchy; and
  said adjusting step adjusts an x coordinate of said new effective camera position to maintain said displacement distance with respect to said one reference node as found in said new partial hierarchy fetched in said fetching step;
  whereby, a user viewing said current partial hierarchy at said current camera position can navigate in a substantially straight line to a new navigator position.

7. A computer-implemented method for navigating through partial hierarchies, the method comprising the steps of:
  determining a new effective camera position (x,z) within a current partial hierarchy based on a new navigator position;
  fetching a new partial hierarchy corresponding to said new effective camera position;
  determining an orientation between said new effective camera position and at least one reference object in said current partial hierarchy;
  adjusting said new effective camera position to maintain said orientation with the said at least one reference object as found in said new partial hierarchy fetched in said fetching step;
  converting said adjusted new effective camera position to a new camera position; and
  displaying a display view showing said fetched partial hierarchy layout in a field of view of a camera positioned at said new camera position;
  wherein said orientation determining step determines an angular orientation between said new effective camera position and one object selected for zooming in the current partial hierarchy;
  wherein said orientation determining step comprises the step of:
    determining an angle θ between said new effective camera position and said selected object in said current partial hierarchy; and
    wherein said adjusting step adjusts an x coordinate of said new effective camera position to maintain said angle θ with respect to said selected object as found in said new partial hierarchy fetched in said fetching step;
    whereby, a user viewing said current partial hierarchy at said current camera position can navigate in a substantially straight line to a new navigator position.

8. A computer-implemented method for navigating through partial hierarchies, the method comprising the steps of:
  determining a new effective camera position (x,z) within a current partial hierarchy based on a new navigator position;
  fetching a new partial hierarchy corresponding to said new effective camera position;
  determining an orientation between said new effective camera position and at least one reference object in said current partial hierarchy;
  adjusting said new effective camera position to maintain said orientation with the said at least one reference object as found in said new partial hierarchy fetched in said fetching step;
  converting said adjusted new effective camera position to a new camera position;
  displaying a display view showing said fetched partial hierarchy layout in a field of view of a camera positioned at said new camera position;
  permitting a user to mark at least one of a selected object or a selected location in said displayed partial hierarchy;
  storing absolute coordinates for a mark that identifies a specific location; and
  interpreting said absolute coordinates directly when a camera position is at approximately the same z coordinate position as a z coordinate of said absolute coordinates, and otherwise transforming said absolute coordinates to a coordinate system at the camera position;
  whereby, a user viewing said current partial hierarchy at said current camera position can navigate in a substantially straight line to a new navigator position.

9. A computer graphics system for navigating through partial hierarchies, comprising:
  means for determining a new effective camera position (x,z) within a current partial hierarchy based on a new navigator position;
  means for fetching a new partial hierarchy corresponding to said new effective camera position;
  means for determining an orientation between said new effective camera position and at least one reference object in said current partial hierarchy;
  means for adjusting said new effective camera position to maintain said orientation with the said at least one reference object as found in said new partial hierarchy fetched by said fetching means;
  means for converting said adjusted new effective camera position to a new camera position; and
  means for displaying a display view showing said fetched partial hierarchy layout in a field of view of a camera positioned at said new camera position;
  wherein said orientation determining means determines an orientation between said new effective camera position and two reference objects in the current partial hierarchy; and
  wherein said orientation determining means comprises:
    means for finding two reference nodes in the current partial hierarchy,
    means for determining a point in front of said new effective camera position on a line intersecting said two reference nodes, and
    means for calculating a proportion of the distance between said determined point and one of said two reference nodes; and
    wherein said adjusting means adjusts an x coordinate of said new effective camera position to maintain said proportion with said one reference node as found in said new partial hierarchy fetched by said fetching means;
    whereby, a user viewing said current partial hierarchy at said current camera position can navigate in a substantially straight line to a new navigator position.

10. The system of claim 9, wherein said fetching means fetches said new partial hierarchy from a cache of partial hierarchies or fetches said new partial hierarchy from an interpolator.

11. The system of claim 9, wherein said fetching means generates said new partial hierarchy on the fly.

12. The system of claim 9, further comprising:
means for permitting a user to mark at least one of a selected object or a selected location in said displayed partial hierarchy.

13. The system of claim 12, further comprising:
means for storing relative coordinates for a mark that identifies a location of said mark relative to coordinates for the selected object.

14. A computer graphics system for navigating through partial hierarchies, comprising:
means for determining a new effective camera position (x,z) within a current partial hierarchy based on a new navigator position;
means for fetching a new partial hierarchy corresponding to said new effective camera position;
means for determining an orientation between said new effective camera position and at least one reference object in said current partial hierarchy;
means for adjusting said new effective camera position to maintain said orientation with the said at least one reference object as found in said new partial hierarchy fetched by said fetching means;
means for converting said adjusted new effective camera position to a new camera position; and
means for displaying a display view showing said fetched partial hierarchy layout in a field of view of a camera positioned at said new camera position;
wherein said orientation determining means determines an orientation between said new effective camera position and one reference object in the current partial hierarchy; and
wherein said orientation determining means comprises:
means for finding one reference node in the current partial hierarchy,
means for determining a displacement distance between said new effective camera position and said one reference node in said current partial hierarchy; and
wherein said adjusting means adjusts an x coordinate of said new effective camera position to maintain said displacement distance with respect to said one reference node as found in said new partial hierarchy fetched by said fetching means;
whereby, a user viewing said current partial hierarchy at said current camera position can navigate in a substantially straight line to a new navigator position.

15. A computer graphics system for navigating through partial hierarchies, comprising:
means for determining a new effective camera position (x,z) within a current partial hierarchy based on a new navigator position;
means for fetching a new partial hierarchy corresponding to said new effective camera position;
means for determining an orientation between said new effective camera position and at least one reference object in said current partial hierarchy;
means for adjusting said new effective camera position to maintain said orientation with the said at least one reference object as found in said new partial hierarchy fetched by said fetching means;
means for converting said adjusted new effective camera position to a new camera position; and
means for displaying a display view showing said fetched partial hierarchy layout in a field of view of a camera positioned at said new camera position;
wherein said orientation determining means determines an angular orientation between said new effective camera position and one object selected for zooming in the current partial hierarchy;
wherein said orientation determining means comprises:
means for determining an angle $\theta$ between said new effective camera position and said selected object in said current partial hierarchy; and
wherein said adjusting means adjusts an x coordinate of said new effective camera position to maintain said angle $\theta$ with respect to said selected object as found in said new partial hierarchy fetched by said fetching means;
whereby, a user viewing said current partial hierarchy at said current camera position can navigate in a substantially straight line to a new navigator position.

16. A computer graphics system for navigating through partial hierarchies, comprising:
means for determining a new effective camera position (x,z) within a current partial hierarchy based on a new navigator position;
means for fetching a new partial hierarchy corresponding to said new effective camera position;
means for determining an orientation between said new effective camera position and
at least one reference object in said current partial hierarchy; means for adjusting said new effective camera position to maintain said orientation with the said at least one reference object as found in said new partial hierarchy fetched by said fetching means;
means for converting said adjusted new effective camera position to a new camera position;
means for displaying a display view showing said fetched partial hierarchy layout in a field of view of a camera positioned at said new camera position;
means for permitting a user to mark at least one of a selected object or a selected location in said displayed partial hierarchy;
means for storing absolute coordinates for a mark that identifies a specific location; and
means for interpreting said absolute coordinates directly when a camera position is at approximately the same z coordinate position as a z coordinate of said absolute coordinates, and otherwise transforming said absolute coordinates to a coordinate system at the camera position;
whereby, a user viewing said current partial hierarchy at said current camera position can navigate in a substantially straight line to a new navigator position.

17. A computer program product comprising a computer useable medium having computer program logic recorded thereon for enabling a processor in a computer system to navigate through partial hierarchies, said computer program logic comprising:
means for enabling the processor to determine a new effective camera position (x,z) within a current partial hierarchy based on a new navigator position;

means for enabling the processor to fetch a new partial hierarchy corresponding to said new effective camera position;

means for enabling the processor to determine an orientation between said new effective camera position and at least one reference object in said current partial hierarchy;

means for enabling the processor to adjust said new effective camera position to maintain said orientation with the said at least one reference object as found in said new partial hierarchy fetched by said fetching means;

means for enabling the processor to convert said adjusted new effective camera position to a new camera position;

means for enabling the processor to display a display view showing said fetched partial hierarchy layout in a field of view of a camera positioned at said new camera position;

means for enabling the processor to permit a user to mark at least one of a selected object or a selected location in said displayed partial hierarchy;

means for enabling the processor to store absolute coordinates for a mark that identifies a specific location; and means for enabling the processor to interpret said absolute coordinates directly when a camera position is at approximately the same z coordinate position as a z coordinate of said absolute coordinates, and otherwise to transform said absolute coordinates to a coordinate system at the camera position;

whereby, a user viewing said current partial hierarchy at said current camera position can navigate in an approximately straight line to a new navigator position.

18. A computer graphics system for navigating through partial hierarchies, comprising:

a hierarchy manager that determines a new effective camera position (x,z) within a current partial hierarchy based on a new navigator position, fetches a new partial hierarchy corresponding to the new effective camera position, determines an orientation between the new effective camera position and at least one reference object in said current partial hierarchy, adjusts the new effective camera position to maintain the orientation with the said at least one reference object as found in the new partial hierarchy, and converts the adjusted new effective camera position to a new camera position; and a display that displays a display view showing said fetched partial hierarchy layout in a field of view of a camera positioned at said new camera position;

wherein said hierarchy manager determines an orientation between said new effective camera position and two reference objects in said current partial hierarchy; and wherein said hierarchy manager finds two reference nodes in said current partial hierarchy, determines a point in front of said new effective camera position on a line intersecting the two reference nodes, calculates a proportion of the distance between the determined point and one of the two reference nodes, and adjusts an x coordinate of said new effective camera position to maintain said proportion with the one reference node as found in said new partial hierarchy;

whereby, a user viewing said current partial hierarchy at said current camera position can navigate in a substantially straight line to a new navigator position.

19. The system of claim 18, wherein said hierarchy manager fetches said new partial hierarchy from a cache of partial hierarchies or fetches said new partial hierarchy from an interpolator.

20. The system of claim 18, wherein said hierarchy manager generates said new partial hierarchy on the fly.

21. The system of claim 18, wherein said hierarchy manager allows a user to mark at least one of a selected object or a selected location in said displayed partial hierarchy.

22. The system of claim 21, wherein said hierarchy manager stores relative coordinates for a mark that identifies a location of said mark relative to coordinates for the selected object.

23. A computer graphics system for navigating through partial hierarchies, comprising:

a hierarchy manager that determines a new effective camera position (x,z) within a current partial hierarchy based on a new navigator position, fetches a new partial hierarchy corresponding to the new effective camera position, determines an orientation between the new effective camera position and at least one reference object in said current partial hierarchy, adjusts the new effective camera position to maintain the orientation with the said at least one reference object as found in the new partial hierarchy, and converts the adjusted new effective camera position to a new camera position; and a display that displays a display view showing said fetched partial hierarchy layout in a field of view of a camera positioned at said new camera position;

wherein said hierarchy manager determines an orientation between said new effective camera position and one reference object in the current partial hierarchy; and wherein said hierarchy manager finds one reference node in the current partial hierarchy, determines a displacement distance between said new effective camera position and the one reference node in said current partial hierarchy, and adjusts an x coordinate of said new effective camera position to maintain the displacement distance with respect to the one reference node as found in said new partial hierarchy;

whereby, a user viewing said current partial hierarchy at said current camera position can navigate in a substantially straight line to a new navigator position.

24. A computer graphics system for navigating through partial hierarchies, comprising:

a hierarchy manager that determines a new effective camera position (x,z) within a current partial hierarchy based on a new navigator position, fetches a new partial hierarchy corresponding to the new effective camera position, determines an orientation between the new effective camera position and at least one reference object in said current partial hierarchy, adjusts the new effective camera position to maintain the orientation with the said at least one reference object as found in the new partial hierarchy, and converts the adjusted new effective camera position to a new camera position; and a display that displays a display view showing said fetched partial hierarchy layout in a field of view of a camera positioned at said new camera position;

wherein said hierarchy manager determines an angular orientation between said new effective camera position and one object selected for zooming in the current partial hierarchy; and wherein said hierarchy manager determines an angle θ between said new effective camera position and said selected object in said current partial hierarchy, and adjusts an x coordinate of said new effective camera position to maintain the angle θ with respect to said selected object as found in said new partial hierarchy;

whereby, a user viewing said current partial hierarchy at said current camera position can navigate in a substantially straight line to a new navigator position.

25. A computer graphics system for navigating through partial hierarchies, comprising:

a hierarchy manager that determines a new effective camera position (x,z) whine a current partial hierarchy based on a new navigator position, fetches a new partial hierarchy corresponding to the new effective camera position, determines an orientation between the new effective camera position and at least one reference object in said current partial hierarchy, adjusts the new effective camera position to maintain the orientation with the said at least one reference object as found in the new partial hierarchy, and converts the adjusted new effective camera position to a new camera position; and a display that displays a display view showing said fetched partial hierarchy layout in a field of view of a camera positioned at said new camera position;

wherein said hierarchy manager allows a user to mark at least one of a selected object or a selected location in said displayed partial hierarchy;

wherein said hierarchy manager stores absolute coordinates for a mark that identifies a specific location, interprets said absolute coordinates directly when a camera position is at approximately the same z coordinate position as a z coordinate of said absolute coordinates, and transforms said absolute coordinates to a coordinate system at the camera position;

whereby, a user viewing said current partial hierarchy at said current camera position can navigate in a substantially straight line to a new navigator position.

* * * * *

UNITED STATES PATENT AND TRADEMARK OFFICE
CERTIFICATE OF CORRECTION

PATENT NO.     : 6,111,578
DATED          : August 29, 2000
INVENTOR(S)    : Joel D. Tesler It is certified that error appears in the above-identified patent and that said Letters Patent is hereby corrected as shown below:

Title page,
Item [56], References Cited, OTHER PUBLICATIONS, please list the following document citations:

-- Ahlberg *et al.*, "IVEE: An Information Visualization & Exploration Environment," Proceedings of Information Visualization '95, 1995, pp. 66 - 73.

Becker *et al.*, "Smooth Transitions between Bump Rendering Algorithms," *Computer Graphics Proceedings*, Annual Conference Series, 1993, pp. 183 - 190.

Becker et al., "Unsteady Flow Volumes," *Proceedings of Visualization '95*, pp. 329 - 335.

Blinn, James F., "Light Reflection Functions for Simulation of Clouds and Dusty Surfaces," *Computer Graphics*, Vol. 16, No. 3, July 1982, p. 116 - 124.

Crawfis *et al.*, "Texture Splats for 3D Scalar and Vector Field Visualization," *Proceedings of IEEE Visualization '93*, 1993, pp. 261 - 265.

Crawfis *et al.*, "Vector Field Visualization," *Computer Graphics and Applications*, Vol. 14, 1994, pp. 50 - 56.

Inselberg *et al.*, "Parallel Coordinates: A Tool for Visualizating Multidimensional Geometry," *Proceedings of Visualization '90*, pp. 361 - 378.

Laur *et al.*, "Hierarchical Splatting: A Progressive Refinement Algorithm for Volume Rendering," *Computer Graphics*, Vol. 25, No. 4, July 1991, pp. 285 - 288.

Levoy, Marc, "Volume Rendering: Display of Surfaces from Volume Data," *IEEE Xomputer Graphics and Applications*, Volume 8, Number 5, May 1988, pp. 29 - 37.

Martin *et al.*, "High Dimensional Brushing for Interactive Exploration of Multivariate Data," *Proceedings of Visualization '95*, 1995, pp. 271 - 278.

Max *et al.*, "Bump Shading for Volume Textures," *IEEE Computer Graphics and Applications*, July 1994, 18 - 20.

Max *et al.*, "Flow Volumes for Interactive Vector Field Visualization," *Proceedings of Visualization '93*, 1993, pp. 19 - 24.

Sabella, Paolo, "A Rendering Algorithm for VIsualizing 3D Scalar Fields," *Computer Graphics*, Vol. 22, No. 4, August 1988, pp. 51 - 58.

Stein *et al.*, "Sorting and Hardware Assisted Rendering for Volume Visualization," *IEEE*, 1995, pp. 83 - 89.

Van Wijk *et al.*, "HyperSlice," *Proceedings of Visualization '93*, 1993, pp. 119 - 125.

Westover, Lee, "Footprint Evaluation for Volume Rendering," *Computer Graphics*, Vol. 24, No. 4, August 1990, pp. 367 - 376.

UNITED STATES PATENT AND TRADEMARK OFFICE
CERTIFICATE OF CORRECTION

PATENT NO. : 6,111,578
DATED : August 29, 2000
INVENTOR(S) : Joel D. Tesler

It is certified that error appears in the above-identified patent and that said Letters Patent is hereby corrected as shown below:

Title page (cont'd),

Wilhelms et al., "A Coherent Projection Approach for Direct Volume Rendering," *Computer Graphics*, Vol. 25, No. 4, July 1991, pp. 275 - 284.

Wong et al., "Dual Multiresolution HyperSlice for Multivariate Data Visualization," *IEEE Symposium on Information Visualization*, October 1996, pp. 74 - 75.

Carlbom et al., "A Hierarchical Data Structure for Representing the Spatial Decomposition of 3-D Objects", *IEEE Computer Graphics & Applications*, April 1985, pp. 24-31.

Carlbom et al., "Planar Geometric Projections and Viewing Transformations" *Computing Surveys*, Vol. 10, No. 4, December 1978, pp. 465-502.

Beveaux, T., "Virtual Reality Gets Real", *New Media*, (January 1993), pp. 32-35.

Graves, G.L., "NASA's Virtual Reality", *New Media*, (January 1993), p. 36-38.

Graves, G.L., "Invasion of the Digital Puppets", *New Media*, (January 1993), p. 38-40.

Yavelow, C., "3-D Sound Found In Space", *New Media*, (January 1993), pp. 40-41.

Johnson, Brian and Ben Shneiderman, "Tree-Maps: A Space-Filling Approach to the Visualization of Hierarchical Information Structures", *IEEE Visualization Proceedings '91*, October 1991, pp. 284-291.

Structural Dynamics Research Corporation News Release, "SDRC Announces Software Translator Between CADAM and I-DEAS", March 31, 1992.

Jacobson, Bob, "The Ultimate User Interface", *BYTE*, April 1992, pp. 175-182.

Clarkson, Mark A., "An Easier Interface", *BYTE*, February 1991, pp. 277-282.

Radding, Alan, "PC GIS: Expect Gain But Also Some Pain", *Computerworld*, February 17, 1992, pg. 89.

Hilderbrand, Carol, "GIS Vital In Utility's Duel with Competitor", *Computerworld*, January 20, 1992, pg. 43.

Anthes, G.H., "GIS Eases Redistricting Worry", *Computerworld*, October 7, 1991, pg. 65.

Alexander, Michael, "GIS Sprouting Corporate Wings", *Computerworld*, July 22, 1991, pg. 20.

Wilder, C., "Virtual Reality Seeks Practicality", *Computerworld 26 (17)*, April 27, 1992, p. 26.

Fairchild, Kim M., Steven E. Poltrock and George W. Furnas, "SemNet: Three-Dimensional Graphic Representations of Large Knowledge Bases", *Cognitive*

UNITED STATES PATENT AND TRADEMARK OFFICE
CERTIFICATE OF CORRECTION

PATENT NO. : 6,111,578
DATED : August 29, 2000
INVENTOR(S) : Joel D. Tesler

Page 3 of 9

It is certified that error appears in the above-identified patent and that said Letters Patent is hereby corrected as shown below:

Title page (cont'd),

*Science and its Applications for Human-Computer Interaction*, Guindon, Ed., 1988, pp. 201-233.

*Precision Visuals International Limited*, "Summary of PV-WAVE Point & Click Visual Data Analysis Software", 1991.

Flanagan, William G., "Cyberspace Meets Wall Street", *Forbes*, June 22, 1992, pp. 164-168.

Grinstein, G. *et al.*, "Visualization for Knowledge Discovery", *Intl. J. Intelligent Systems 7*, 1992, pp. 637-648.

Fuller, J.E., Using Autocad, 3d Ed., Chapter 17, *Viewing 3-D Drawings*, 1989, pp. 17-1 - 17-14, and Tutorial, pp. 19-15 - 19-16, Delmar Publishers, Inc., Albany, NY 12212.

Alexander, M., "Visualizing Cleared-Off Desktops", *Computerworld 25 (18)*, May 6, 1991, p. 20.

Benedikt, M., ed., *Cyberspace First Steps*, The MIT Press, Cambridge, Massachusetts (1992), pp. 1-436.

Forrest, D., "Seeing Data in New Ways", *Computerworld*, June 29, 1992, pp. 85-86.

Newquist, H.P., "Virtual Reality's Commercial Reality", *Computerworld 26 (3)*, pp. 93-95.

"Atlas Software: A New Dimension in Data Management", advertisement, Atlas Software, Strategic Mapping, Inc., San Jose, CA 95117 (page and date unknown).

"News: What's New - Business Software", *BYTE*, March 1992, p. 78.

"A Map for All Reasons", advertisement, Strategic Mapping, Inc., San Jose, CA 95117 (page and date unknown).

News Release, Company: Information Builders, Dateline: Pacific Palisades, CA, "Remarkable 3D Main-Frame Graphics Available For PC Users", February 1985.

News Release, Company: Honeywell Bull, Dateline: Palm Desert, CA, "Information Builders Announces Release 3.0 of PC/Focus DBMS", June 1, 1987.

News Release, Company: Silicon Graphics, Dateline: Bilerica, MA "Relational Software System Increases Integration, Productivity for Honeywell Bull Users", July 17, 1987.

News Release, Company: Alliant Computer Systems, Dateline: San Diego, CA, "TGS' Figaro To Be Marketed With Silicon Graphics", July 8, 1988.

UNITED STATES PATENT AND TRADEMARK OFFICE
CERTIFICATE OF CORRECTION

PATENT NO.    : 6,111,578
DATED         : August 29, 2000
INVENTOR(S)   : Joel D. Tesler It is certified that error appears in the above-identified patent and that said Letters Patent is hereby corrected as shown below:

Title page (cont'd),

News Release, Company: Alliant Computer Systems, Dateline: Atlanta, GA, "Alliant Debuts New Class of System The Visual Supercomputer", August 2, 1988.

News Release, Company: Virtus, Dateline: Pleasanton, CA, "INDIVIDUAL Software Introduces Training for Microsoft Excel 3.0 Windows and Macintosh Versions", July 31, 1991.

News Release, Company: Virtus Corporation, Dateline: Cary, NC, "Virtus Walkthrough Releases Quicktime Component", November 1, 1991.

News Release, Company: Alias Research, Dateline: Toronto, Ontario, "Alias Ships Sketch!, Freeform 3D Illustration and Design Program", November 15, 1991.

News Release, Company: Structural Dynamics Res. Intl. Business Machines, Dateline: Boston MA, "Alias Sketch (TM) Resumes Shipping: Freeform 3D Illustration and Design Tool", February 19, 1992.

Pollack, A., "The 2-D Screen Gives 3-D World" New York Times (date unknown).

Foley et al., "Computer Graphics: Principals and Practice", Second Edition, Addison-Wesley Publishing Co., 1990, pages 731-734 and color plate III.23

Aha, D.W. et al., "Instance-Based Learning Algorithms," *Machine Learning*, Vol. 6, No. 1, pp. 37-66 (Jan. 1991).

Almuallim, H. and Dietterich, T.G., "Learning Boolean Concepts in the Presence of Many Irrelevant Features," *Artificial Intelligence*, Vol. 69, Nos. 1-2, pp. 279-305 (Sept. 1994).

"ANGOSS SOFTWARE ANNOUNCES KNOWLEDGE STUDIO DATA MINING SOLUTION," *http://www.pathfinder.com/@@xIEkOgYAVjbJZjKM/money/latest/press/PW/1997Oct27/92*, ANGOSS Software Corporation, pp. 1-2, October 1997.

"ANGOSS SOFTWARE's KnowledgeSEEKER(TM) COMPATIBLE WITH SAS INSTITUTE," *http://www.newswire.ca/releases/September1997/18/c3915.html*, pgs. 1-2, Canada Newswire, September 1997.

Breiman et al., *Classification and Regression Trees*, Wadsworth International Group, entire book (1984).

Cestnik, B., "Estimating Probabilities: A Crucial Task in Machine Learning," *Proceedings of the 9th European Conference on Artificial Intelligence*, pp. 147-149 (Aug. 1990).

"Companies in Data Mining and Knowledge Discovery," *http://kdnuggets.com/companies.html*, pgs. 1-4, Last updated: October 31, 1997.

Cormen, T.H., et al., *Introduction to Algorithms*, The MIT Press, pp. 263-280 (1990).

UNITED STATES PATENT AND TRADEMARK OFFICE
CERTIFICATE OF CORRECTION

PATENT NO. : 6,111,578
DATED : August 29, 2000
INVENTOR(S) : Joel D. Tesler

It is certified that error appears in the above-identified patent and that said Letters Patent is hereby corrected as shown below:

Title page (cont'd),

Cover and Thomas, *Elements of Information Theory*, Wiley Interscience, entire book, 1991.

Dasarathy, B.V., "Nearest Neighbor (NN) Norms: (NN) Patterns Classification Techniques," (IBL), *IEEE Computer Society Press*, pp. 1-30 (1990).

"Data Mining and Knowledge Discovery References," *http://kdnuggets.com/references.html*, pgs. 1-3, Last updated: October 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105-112 (1996).

Duda, R. and Hart, P., *Pattern Classification and Scene Analysis*, Wiley, entire book, (1973).

Fairchild, K.M., "Information Management Using Virtual Reality-Based Visualizations," *Virtual Reality Applications and Explorations*, ed. A. Wexelblat, Academic Press, Inc., pp. 45-74, Copyright (1993), Publication date July 1, 1993.

Fisher, R.A., "The use of multiple measurements in taxonomic problems," *Annals of Eugenics*, Vol. 7., No. 1, pp. 179-188 (1936).

Friedman, J. H. et al., "Lazy Decision Trees," *Proceedings of the Thirteenth National Conference on Artificial Intelligence*, AAAI Press and the MIT Press, Vol. 1, pp. 717-724 (1996).

Good, I.J., *The Estimation of Probabilities: An Essay on Modern Bayesian Methods*, pp. xi-xii, MIT Press, pp. 1-79, (1965).

"IBM Digs Deep for Data Mining 'Gold'," *http://www.software.ibm.com/data/intelli-mine/factsheet.html*, pgs. 1-8, IBM Corporation, Copyright 1997.

"KD Mine: Data Mining and Knowledge Discovery," *http://kdnuggets.com/index_kdm.html*, page 1, Knowledge Discovery Nuggets, Copyright 1997, Last updated: October 31, 1997.

Kittler, J., "Feature Selection and Extraction," *Handbook of Pattern Recognition and Image Processing*, Chapter 3, pp. 59-83, Academic Press, Inc., 1986.

Knuth, A., *The Art of Computer Programming*, Addison-Wesley, Vol. 2, pp. 506-550 (1973).

Kohavi, R., "Scaling Up the Accuracy of Naive-Bayes Classifiers: a Decision-Tree Hybrid," In *Data Mining and Visulaization*, Silicon Graphics, Inc., from The Second International Conference on Knowledge Discovery and Data Mining (1996).

UNITED STATES PATENT AND TRADEMARK OFFICE
CERTIFICATE OF CORRECTION

PATENT NO.    : 6,111,578
DATED         : August 29, 2000
INVENTOR(S)   : Joel D. Tesler It is certified that error appears in the above-identified patent and that said Letters Patent is hereby corrected as shown below:

Title page (cont'd),

Kohavi, R., "A Study of Cross-Validation and Bootstrap for Accuracy Estimation and Model Selection," *Proceedings of the 14th International Joint Conference on Artifical Intelligence*, Stanford University, 1995.

Kohavi, R. and John, G., "Wrappers for Feature Subset Selection," *http://robotics.stanford.edu/~{ronnyk,gjohn}*, May 20, 1997.

Kohavi, R. and Li, C., "Oblivious Decision Trees, Graphs, and Top-Down Pruning," *Proceedings of the 14th International Joint Conference on Artificial Intelligence*, Chriss S. Mellish (Ed.), Morgan Kaufmann Publishers, Inc., pp. 1071-1077 (1995).

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192-197 (Aug. 1995)

Kohavi, R. *et al.*, "Data Mining using MLC++: A Machine Learning Library in C++," *Tools With AI*, pp. 234-245 (1996).

Kononenko, I., "Inductive and Bayesian Learning in Medical Diagnosis," *Applied Artificial Intelligence*, Vol. 7, pp. 317-337 (1993).

Langley, P. and Sage, S., "Induction of Selective Bayesian Classifiers," *Proceedings of the Tenth Conference on Uncertainty in Artificial Intelligence*, Morgan Kaufmann Publishers, Inc., pp. 399-406 (July 1994).

Langley, P. and Sage, S., "Oblivious Decision Trees and Abstract Cases," *Working Notes of the AAAI-94 Workshop on Case-Based Reasoning*, AAAI Press, pp. 113-117 (1994).

Langley, P., *et al.*, "An Analysis of Bayesian Classifiers," *Proceedings of the Tenth National Conference on Artificial Intelligence*, pp. 223-228 (July 1992).

Lincoff, G., *National Audubon Society Field Guide to North American Mushrooms*, New York, pp. 9-32, (1981).

Mangasarian, O. L. and Wolberg, W. H., "Cancer Diagnosis Via Linear Programming," *SIAM News*, Vol. 23, No. 5, pp. 1&18 (Sept. 1990).

Michie, *et al.*, *Machine Learning, Neural and Statistical Classification*, Ellis Norwood United, entire book, (1994).

Murthy, S. *et al.*, "Randomized induction of oblique decision trees," *Proceedings of the Eleventh National Conference on Artificial Intelligence*, AAI Press/MIT Press, pp. 322-327 (1993).

UNITED STATES PATENT AND TRADEMARK OFFICE
CERTIFICATE OF CORRECTION

PATENT NO. : 6,111,578
DATED : August 29, 2000
INVENTOR(S) : Joel D. Tesler

It is certified that error appears in the above-identified patent and that said Letters Patent is hereby corrected as shown below:

Title page (cont'd),

"Other Web Sites for Data Mining and Knowledge Discovery," *http://kdnuggets.com/websites.html*, pgs. 1-3, Last updated: September 10, 1997.

Quinlan, J.R., *C4.5: Programs for Machine Learning*, Morgan Kaufmann Publishers, Inc., pp. 17-26 (1993).

Quinlan, J.R., "Induction of Decision Trees," *Machine Learning*, Vol. 1, No. 1, pp. 81-106 (1986).

Rendell, L. and Seshu, R., "Learning hard concepts through constructive induction: framework and rationale," *Computational Intelligence*, Vol. 6, No. 4, pp. 247-270 (Nov. 1990).

"SAS Data Mining Solution," *http://www.sas.com/software/data_mining/whitepapers/solution.html*, pgs. 1-6, SAS Institute Inc., Copyright 1997, Last Updated September 26, 1997.

Schaffer, C., "A Conservation Law for Generalization Performance," *Machine Learning: Proceedings of the Eleventh International Conference*, Morgan Kaufmann Publishers, Inc., pp. 259-265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," *http://kdnuggets.com/siftware.html*, pgs. 1-2, Last updated: October 31, 1997.

Thrun *et al.*, "The Monk's Problems: A Performance Comparison of Different Learning Algorithms," *Technical Report CMU-CS-91-197*, Carnegie Mellon University pp. i-x and 1-112, (1991).

Utgoff, P., "Perceptron Trees: A Case Study in Hybrid Concept Representation," *Proceedings of the Seventh National Conference on Artificial Intelligence*, Morgan Kaufmann, Vol. 2, pp. 601-606 (Aug. 1988).

Weiss, S.M. and Kulikowski, C.A., <u>Computer Systems That Learn: Classification and Prediction Methods from Statistics, Neural Nets, Machine Learning, and Expert Systems</u>, Morgan Kaufmann Publishers, Inc., entire book, (1991).

MineSet User's Guide, Silicon Graphics Computer Systems, 1996, *made available to public less than one year prior to March 7, 1997.*

Greenwood, J., "Countdown to the Cybermarket," Financial Post Magazine, March, 1994, pp. 26-32.

Boyl, J. *et al.*, "Design of a 3D user interface to a database," submitted to Database Issues for Data Visualization Workshop, July, 1993, pp. 1-9.

UNITED STATES PATENT AND TRADEMARK OFFICE
CERTIFICATE OF CORRECTION

PATENT NO. : 6,111,578
DATED : August 29, 2000
INVENTOR(S) : Joel D. Tesler

It is certified that error appears in the above-identified patent and that said Letters Patent is hereby corrected as shown below:

Title page (cont'd),

Gershon, N. et al., "Visualization's New Tack: Making Sense of Information," IEEE Spectrum, November, 1995, pp.38-47 and 55.

"Mineset Awards," http://www.sgi.com/Products/software/MineSet/awards.html, pg. 1, (January 9, 1998).

"Silicon Graphics MineSet Wins Bronze Miner Award," http://www.sgi.com/Headlines/1997/October/mineset_release.html, pp. 1-2, (October 1, 1997).

"The 1997 Database Dozen," by D. Stodder, http://www.dbpd.com/96dozen.htm, pp. 1-2, (1996 or 1997).

"A Dozen Companies on the Rise," http://www.dbpd.com/seconddz.htm, pp. 1-9, (Miller Freeman Inc. 1997).

"MineSet 2.0 for Data Mining and Multidimensional Data Analysis," by C. Hall, http:// www.sgi.com/Products/software/MineSet/DMStrategies/, pp. 1-12, (1997). (originally appeared in September 1997 issue of Data Management Strategies, Copyright 1997 Cutter Information Corp.)

Amsbury, W., Data Structures from Arrays to Priority Queues, Wadsworth Publishing, Belmont, CA, pp. viii and 331-336, Copyright 1985.

Date et al., A Guide to SQL/DS, Addison-Wesley Publishing, New York, NY, pp. xiii and 97-118, Copyright 1989.

Hecht-Nielsen, R., Neurocomputing, Addison-Wesley Publishing, New York, NY, pp. ix-xiii and 175-201, Copyright 1990.

Hsiao et al., "Supervised Textured Image Segmentation Using Feature Smoothing and Probabilistic Relaxation Techniques", IEEE Transactions on Pattern Analysis and Machine Intelligence, Vol. 11, No. 12, pp. 1279-1292, December 1989.

Robert et al., "Continuously Evolving Classification of Signals Corrupted by an Abrupt Change", IEEE-IMS Workshop on Information Theory and Statistics, page 97, October 1994.

Santos-Victor et al., "A Computer Vision System for the Characterization and Classification of Flames in Glass Furnaces", IEEE Transactions on Industry Applications, Vol. 29, No. 3, pp. 470-478, June 1993.

Taxt et al., "Segmentation of Document Images", IEEE Transactions on Pattern Analysis and Machine Intelligence, Vol. 11, No. 12, pp. 1322-1329, December 1989.

UNITED STATES PATENT AND TRADEMARK OFFICE
CERTIFICATE OF CORRECTION

PATENT NO.    : 6,111,578
DATED         : August 29, 2000
INVENTOR(S)   : Joel D. Tesler It is certified that error appears in the above-identified patent and that said Letters Patent is hereby corrected as shown below:

Column 39,
Line 12, please replace "whine" with -- within --.

Signed and Sealed this

Twenty-eighth Day of June, 2005

JON W. DUDAS
*Director of the United States Patent and Trademark Office*